United States Patent
Xu et al.

(10) Patent No.: US 11,091,708 B2
(45) Date of Patent: Aug. 17, 2021

(54) SYSTEM AND PROCESS FOR STEAM CRACKING AND PFO TREATMENT INTEGRATING SELECTIVE HYDROGENATION AND RING OPENING

(71) Applicant: Saudi Arabian Oil Company, Dhahran (SA)

(72) Inventors: Qi Xu, Dhahran (SA); Raed Abudawoud, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 5 days.

(21) Appl. No.: 16/668,731

(22) Filed: Oct. 30, 2019

(65) Prior Publication Data
US 2021/0130710 A1 May 6, 2021

(51) Int. Cl.
*C10G 69/06* (2006.01)
*C10G 69/04* (2006.01)
*B01J 19/24* (2006.01)

(52) U.S. Cl.
CPC ............ *C10G 69/06* (2013.01); *B01J 19/245* (2013.01); *C10G 69/04* (2013.01); *B01J 2219/0004* (2013.01); *C10G 2400/30* (2013.01)

(58) Field of Classification Search
CPC .... C10G 69/06; C10G 69/04; C10G 2400/30; C10G 67/00; C10G 67/02; B01J 19/245; B01J 2219/0004
See application file for complete search history.

(56) References Cited

U.S. PATENT DOCUMENTS

| 4,022,681 A | 5/1977 | Sheng et al. |
| 4,427,526 A | 1/1984 | Stadelhofer et al. |

(Continued)

FOREIGN PATENT DOCUMENTS

| CN | 1478139 A | 2/2004 |
| CN | 101712889 B | 1/2013 |

(Continued)

OTHER PUBLICATIONS

"Selective Hydrocracking of Pyrolysis Fuel Oil Into Benzene, Toluene and Xylene Over Como/Beta Zeolite Catalyst;" Upare, Dipali P et al.; Journal of Industrial and Engineering Chemistry, vol. 46, Feb. 25, 2017, pp. 356-363 (Abstract Only).

(Continued)

*Primary Examiner* — Randy Boyer
*Assistant Examiner* — Juan C Valencia
(74) *Attorney, Agent, or Firm* — Abelman, Frayne and Schwab

(57) ABSTRACT

A process for treatment of PFO from a steam cracking zone includes selectively hydrogenating PFO or a portion thereof for conversion of polyaromatics compounds contained in the PFO into aromatic compounds with one benzene ring to produce a selectively hydrogenated stream. The selectively hydrogenated stream is reacted in the absence of added hydrogen for selective ring opening and dealkylation to produce a dealkylated BTX+ stream. The dealkylated BTX+ stream is separated into BTX compounds. Optionally the PFO is separated into a first stream containing C9+ aromatics compounds with one benzene ring, and a second stream containing C10+ aromatic compounds, whereby the first stream containing C9+ aromatics compounds with one benzene ring is passed to the ring opening step, and the feed to the selective hydrogenation step comprises all or a portion of the second stream containing C10+ aromatic compounds.

25 Claims, 6 Drawing Sheets

(56) References Cited

U.S. PATENT DOCUMENTS

| | | | |
|---|---|---|---|
| 4,765,883 | A | 8/1988 | Johnson et al. |
| 6,069,286 | A | 5/2000 | Wu et al. |
| 7,272,498 | B2* | 9/2007 | Singh ............... G01C 21/3647 340/995.19 |
| 7,301,063 | B2 | 11/2007 | Choi et al. |
| 7,513,988 | B2 | 4/2009 | Oballa et al. |
| 8,142,645 | B2 | 3/2012 | Zhou et al. |
| 8,921,633 | B2 | 12/2014 | Iaccino et al. |
| 8,940,950 | B2 | 1/2015 | Enrich et al. |
| 8,975,460 | B2 | 3/2015 | Königsmann et al. |
| 9,061,953 | B2 | 6/2015 | Johnson et al. |
| 9,073,805 | B2 | 7/2015 | Frey et al. |
| 9,228,139 | B2 | 1/2016 | Shafi et al. |
| 9,228,140 | B2 | 1/2016 | Abba et al. |
| 9,228,141 | B2 | 1/2016 | Sayed et al. |
| 9,255,230 | B2 | 2/2016 | Shafi et al. |
| 9,279,088 | B2 | 3/2016 | Shafi et al. |
| 9,284,497 | B2 | 3/2016 | Bourane et al. |
| 9,284,501 | B2 | 3/2016 | Sayed et al. |
| 9,284,502 | B2 | 3/2016 | Bourane et al. |
| 9,296,961 | B2 | 3/2016 | Shafi et al. |
| 9,382,486 | B2 | 7/2016 | Bourane et al. |
| 9,732,013 | B2 | 8/2017 | Buchanan et al. |
| 10,131,853 | B2 | 11/2018 | Pelaez et al. |
| 10,472,580 | B2 | 11/2019 | Al-Ghamdi et al. |
| 2002/0092797 | A1* | 7/2002 | Choi ..................... B01J 29/068 208/134 |
| 2008/0116109 | A1* | 5/2008 | McCoy ................. C10G 67/049 208/39 |
| 2013/0210611 | A1 | 8/2013 | Kim et al. |
| 2013/0233764 | A1* | 9/2013 | Brown .................. C10G 49/18 208/14 |
| 2013/0253242 | A1 | 9/2013 | Kim et al. |
| 2013/0261365 | A1 | 10/2013 | Wang et al. |
| 2015/0141724 | A1* | 5/2015 | Frey ....................... C10G 45/52 585/319 |
| 2016/0289139 | A1 | 10/2016 | Baird et al. |
| 2016/0289569 | A1 | 10/2016 | Baird et al. |
| 2017/0355911 | A1 | 12/2017 | Koppel et al. |
| 2018/0155642 | A1 | 6/2018 | Al-Ghamdi et al. |
| 2018/0273857 | A1 | 9/2018 | Aramburo et al. |
| 2018/0273859 | A1 | 9/2018 | Frey et al. |
| 2018/0282638 | A1 | 10/2018 | Aramburo et al. |
| 2018/0334623 | A1 | 11/2018 | Funk et al. |
| 2019/0055479 | A1 | 2/2019 | van Kimmenade et al. |

FOREIGN PATENT DOCUMENTS

| | | |
|---|---|---|
| CN | 103436288 A | 12/2013 |
| CN | 103121906 B | 2/2015 |
| CN | 103121895 B | 6/2015 |
| CN | 103121896 B | 6/2015 |
| CN | 104357083 B1 | 8/2016 |
| KR | 2012078006 A | 7/2012 |
| KR | 101753664 B1 | 7/2017 |
| KR | 101791051 B1 | 10/2017 |
| KR | 101815056 B1 | 1/2018 |
| SU | 277246 A | 8/1967 |
| SU | 462857 A1 | 3/1975 |
| SU | 834108 B | 5/1981 |
| WO | 2015128046 A1 | 9/2015 |
| WO | 2017093056 A1 | 6/2017 |

OTHER PUBLICATIONS

"Temperature Selective Condensation of Tyre Pyrolysis Oils to Maximise the Recovery of Single Ring Aromatic Compounds;" William, Paul T. et al.; Fuel, vol. 82, Issue 9, Jun. 2003, pp. 1023-1031 (Abstract Only).

"Characterization of Toluene- and Quinoline-Insoluble Extracted From Pyrolysis Fuel Oil-Derived Pitch for Manufacture of C/C Composites;" Kim, Hong G. et al.; International Journal of Precision Engineering and Manufacturing, Jul. 2018, vol. 19, Issue 7, pp. 1033-1037 (Abstract Only).

"Hydrodealkylation of C9+ Heavy Aromatics to BTX Over Zeolite-Supported Nickel Oxide and Molybdenum Oxide Catalysts;" Shen, Qunbing et al.; Catalysis Letters, vol. 129, pp. 170-180 (2009) (Abstract Only).

"Hydrodealkylation of Heavy Aromatics on MOO3/HZSM-5 Catalyst;" Dong, Jiaojiao et al.; Petrochemical Technology, vol. 37, No. 3, 232-7, Mar. 2008 (Abstract Only).

"Morphology Effect of Beta-Zeolite Supports for NI2P Catalysts on the Hydrocracking of Polycyclic Aromatic Hydrocarbons to Benzene, Toluene, and Xylene;" Kim, Yong-Su et al.; Journal of Catalysis, 351:67-78, Jul. 2017 (Abstract Only).

"An Investigation on the Selective Hydrodealkylation of C-9(+) Aromatics Over Alkali-Treated PT/H-ZSM-5 Zeolites;" Kim, Taewoo et al.; Catalysis Science & Technology, 6 (14): 5599-5607, 2016 (Abstract Only).

"Production of Lower Alkenes and Light Fuels by Gas Phase Oxidative Cracking of Heavy Hydrocarbons;" Zhu, Haiou et al.; Fuel Processing Technology, 87 (7): 649-657, Jul. 2006 (Abstract Only).

"APU(SM) Technology for the Production of BTX and LPG From Pyrolysis Gasoline Using Metal Promoted Zeolite Catalyst;" Choi, Sun et al.; Catalysis Surveys From Asia, 10 (2): 110-116 Jun. 2006 (Abstract Only).

"Conversion of Heavy Aromatic Hydrocarbons to Valuable Synthetic Feed for Steamcrackers;" Cesana, Alberto et al.; Oil Gas European Magazine, 34 (2): 89-94, Jun. 2008 (Abstract Only).

"Catalytic Performance of CROX/SIO2 Catalyst for Hydrodealkylation of C10+ Heavy Aromatics;" Shi, Dx et al.; Chinese Journal of Catalysis, 26 (7): 582-586, Jul. 2005 (Abstract Only).

"Heavy Aromatics Upgrading Using Noble Metal Promoted Zeolite Catalyst;" Oh, S.H. et al.; Studies in Surface Science and Catalysis: Impact of Zeolites and Other Porous Materials on the New Technologies At the Beginning of The New Millennium, Pts A and B, 142: 887-894 Part A&B, 2002 (Abstract Only).

"(191c) APU, A Novel Technology for Producing High Purity BTX;" Nocca, J. et al.; Conference: 2006 AIChE Spring Meeting and Global Congress on Process Safety, Ethylene Producers Conference, Fundamentals and Technology, Apr. 2006 (Abstract Only).

PCT International Search Report and Written Opinion from corresponding PCT Application No. PCT/US2020/055896 dated Jan. 29, 2021.

PCT International Search Report and Written Opinion from PCT Application No. PCT/US2020/055895 dated Jan. 27, 2021.

* cited by examiner

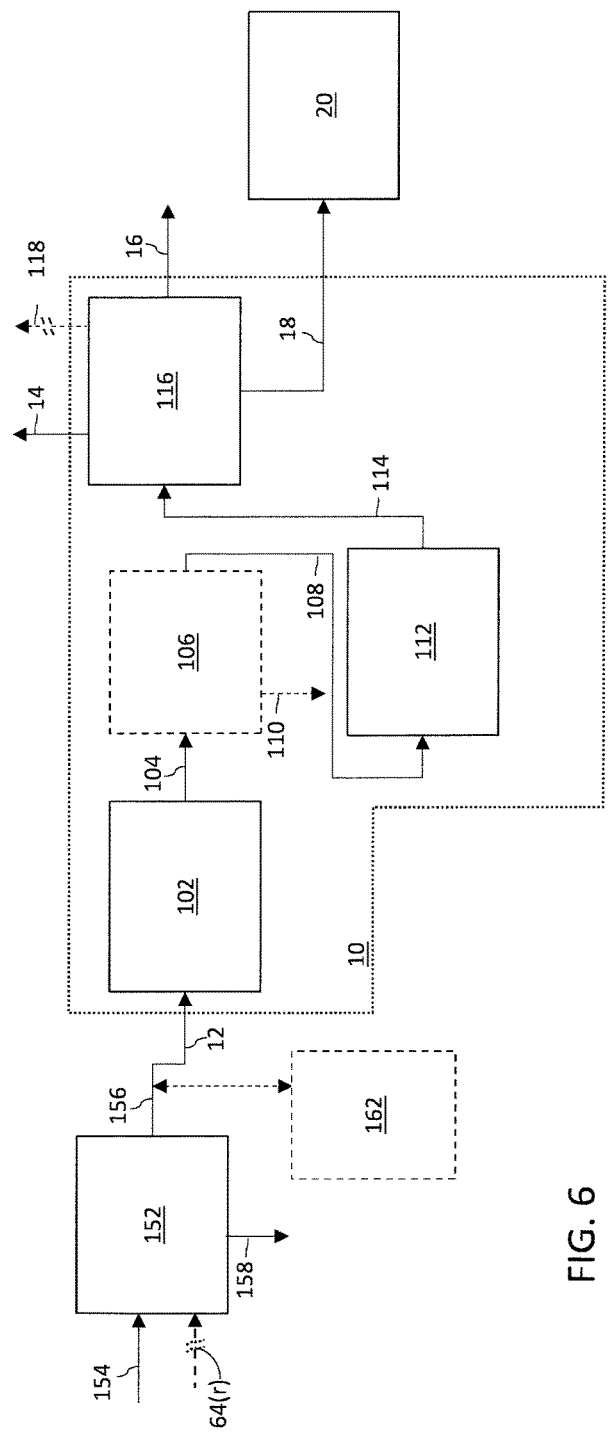
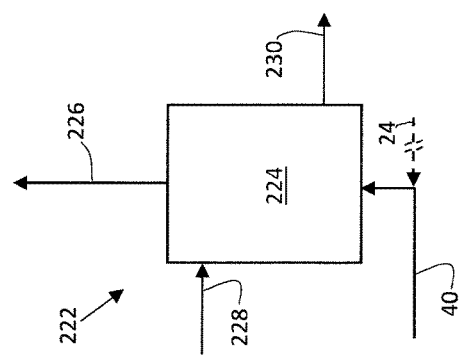
FIG. 6
FIG. 7

SYSTEM AND PROCESS FOR STEAM CRACKING AND PFO TREATMENT INTEGRATING SELECTIVE HYDROGENATION AND RING OPENING

RELATED APPLICATIONS

Not applicable.

BACKGROUND OF THE INVENTION

Field of the Invention

The present disclosure concerns integrated processes and systems to maximize recovery of products including benzene, toluene and xylenes (BTX) from pyrolysis fuel oil (PFO) obtained from a steam cracking unit.

Description of Related Art

Petrochemical refiners are facing issues with utilization of PFO streams obtained from steam cracking. Such steam cracking processes are well known and employ very high temperature, high flow rates and production of large amounts of flammable gases. The overall process conditions are set to maximize useful and valuable chemicals in the steam cracking effluent, the most desirable of which are typically light olefins. Useful and valuable products are also typically obtained from LPG and pyrolysis gasoline, commonly referred to as pygas or py-gas.

The heaviest portion of the steam cracking effluents is commonly referred to as pyrolysis oil, pyrolysis fuel oil (PFO) stream, py-oil or pyoil, which is a C9+ stream that contains C9+ paraffins, monoaromatics, naphtheno-monoaromatics, diaromatics, naphtheno-diaromatics, and poly-aromatics.

In steam cracking operations in which ethane or propane are used as the feedstock, the product is mainly ethene, with other products including methane, propene, butadiene, and py-gas, with relatively small quantity of PFO being produced. In steam cracking operations in which naphtha is used as feedstock, in addition to the light olefin products, the yields of both py-gas and PFO are relatively higher as compared to ethane or propane cracking. The PFO from naphtha cracking contains C9+ paraffins, monoaromatics including BTX components, naphtheno-monoaromatics, diaromatics, naphtheno-diaromatics, and to some extent poly-aromatics with more than three aromatic rings. A typical PFO from steam cracking of naphtha can be further processed conventionally, for example for naphthalene extraction or for production of carbon black (see Ristic et al., *Compositional Characterization of Pyrolysis Fuel Oil from Naphtha and Vacuum Gas Oil*, Energy Fuels, 2018, 32 (2), pp 1276-1286). Table 1 below shows an example of the chemical compositions of PFO streams obtained from the steam cracking of naphtha and the steam cracking of VGO, according to the data disclosed in in Ristic et al., *Compositional Characterization of Pyrolysis Fuel Oil from Naphtha and Vacuum Gas Oil*, Energy & Fuels 32(2) January 2018 (1276-1286), Table 6.

TABLE 1

| Compound name | PFO from naphtha cracking (wt %) | PFO from VGO cracking (wt %) |
|---|---|---|
| naphthalene | 12.5 | 3.8 |
| 1-methylnaphthalene | 2.1 | 2.2 |
| 2-methylnaphthalene | 3.7 | 3.3 |
| acenaphthene | 0.4 | 0.2 |
| acenaphthylene | 1.7 | 1.0 |
| fluorene | 1.1 | 1.0 |
| phenanthrene | 1.6 | 1.4 |
| anthracene | 0.3 | 0.4 |
| fluoranthene | 0.1 | 0.2 |
| pyrene | 0.4 | 0.3 |
| chrysene | 0.1 | 0.1 |

In contrast, with steam cracking of heavier feedstocks, the PFO that is produced contains a much higher quantity of poly-aromatics having three or more aromatic rings. For instance, in certain embodiments, PFO from steam cracking of heavy feedstocks contains at least about 20, 30, 40, 50, or 60 wt % of poly-aromatics having three or more aromatic rings. The below Table 2 shows an example of the chemical composition of a PFO stream obtained from hydroprocessing of Arab light crude oil and steam cracking of a fraction having heavy components separated, for instance cut at 540° C., from the hydroprocessed crude oil, for example, according to the process described in U.S. Pat. No. 9,255,230. This PFO, referred to herein as a "refractory" PFO from the steam cracking of treated crude oil or other treated heavy oil feeds, includes over 40 wt % of poly-aromatics having three or more aromatic rings, which include triaromatics, naphtheno-triaromatics, tetraaromatics, penta-aromatics and heavier poly-aromatics including asphaltenes and coke. These excessive quantities of heavier poly-aromatics are uncommon in PFO from naphtha steam cracking. In addition to the di-aromatics and tri-aromatics, the PFO also contains tetra-aromatics, penta-aromatics and heavier poly-aromatics in concentrations that exceed those from naphtha steam cracking.

TABLE 2

| Compounds | wt % |
|---|---|
| Paraffin (C9+) | 0.64 |
| Monoaromatics | 1.81 |
| Naphtheno-monoaromatics | 3.2 |
| Diaromatics | 20.26 |
| Naphtheno-diaromatics | 9.83 |
| Triaromatics | 9.59 |
| Naphtheno-triaromatics | 7.26 |
| Tetraaromatics | 5.14 |
| Penta-aromatics | 2.04 |
| Other heavier polyaromatics | 40.23 |
| Total | 100 |

Typically, the PFO stream is a rejected stream at the bottom of the steam cracking effluent separator. The PFO stream contains various poly-aromatics including styrene, naphthene, anthracene, bi-phenyl, and also having poly-aromatics with three or more aromatic in higher concentrations in refractory PFO compared to PFO obtained from naphtha cracking. Conventionally, PFO streams from naphtha cracking and also from cracking of heavier feeds are used and/or valued as fuel oil blending components. For instance, in economic evaluations, PFO is valued as a low sulfur fuel oil stream, which is a considerable discount compared to aromatic hydrocarbons including benzene, toluene and mixed xylenes (BTX), or benzene, toluene, ethylbenzene and mixed xylenes (BTEX).

Therefore, a need exists for improved processes and systems for treatment of PFO streams to maximize recovery of BTX or BTEX compounds.

SUMMARY OF THE INVENTION

The above objects and further advantages are provided by the system and process for treatment of refractory PFO from steam cracking of treated crude oil or other treated heavy oil feeds, which comprises at least 40 wt % of polyaromatics having three or more aromatic rings including triaromatics, naphtheno-triaromatics, tetraaromatics, penta-aromatics and heavier poly-aromatics including asphaltenes and coke.

In certain embodiments, a process for treatment of PFO from a steam cracking zone comprises optionally separating the PFO into at least a first stream containing C9+ aromatics compounds with one benzene ring, and a second stream containing C10+ aromatic compounds. All or a portion of the PFO, or all or a portion of the second stream containing C10+ aromatics compounds, is selectively hydrogenated using catalysts and conditions, including hydrogen, that are effective for conversion of polyaromatics compounds contained in the PFO into aromatic compounds with one benzene ring to produce a selectively hydrogenated stream. All or a portion of the selectively hydrogenated stream, and optionally all or a portion of the first stream containing C9+ aromatics compounds with one benzene ring, is reacted using catalysts and conditions, in the absence of added hydrogen, effective for ring opening and dealkylation to produce a dealkylated BTX+ stream. At least a portion of the dealkylated BTX+ stream is separated into BTX compounds.

In certain embodiments, a system for treatment of PFO from a steam cracking zone comprises an optional PFO separation zone having one or more inlets in fluid communication with the steam cracking zone, one or more outlets for discharging a fraction of the PFO including C9+ aromatics compounds with one benzene ring, and one or more outlets for discharging a fraction of the PFO including containing C10+ aromatic compounds. A selective hydrogenation zone includes one or more inlets in fluid communication with the steam cracking zone to receive PFO or the second outlet of the PFO separation zone to receive C10+ aromatic compounds from the PFO, and hydrogen, and one or more outlets discharging reaction effluent including selectively hydrogenated aromatic compounds. A ring-opening dealkylation zone includes one or more inlets in fluid communication with the one or more outlets of the selective hydrogenation zone, and hydrogen, and one or more outlets for discharging reaction effluent including dealkylated BTX+ compounds. A BTX splitting zone includes one or more inlets in fluid communication with the one or more outlets of the ring-opening dealkylation zone for discharging reaction effluent including dealkylated BTX+ compounds, and one or more outlets for discharging BTX compounds.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings, and where:

FIGS. 3, 4, 5 and 6 schematically depict operations of steam cracking units integrated with feed pretreatment; and FIG. 7 is an embodiment of a reaction zone that can be used in the embodiments of FIGS. 1 and 2.

DETAILED DESCRIPTION OF THE INVENTION

Figure 1:
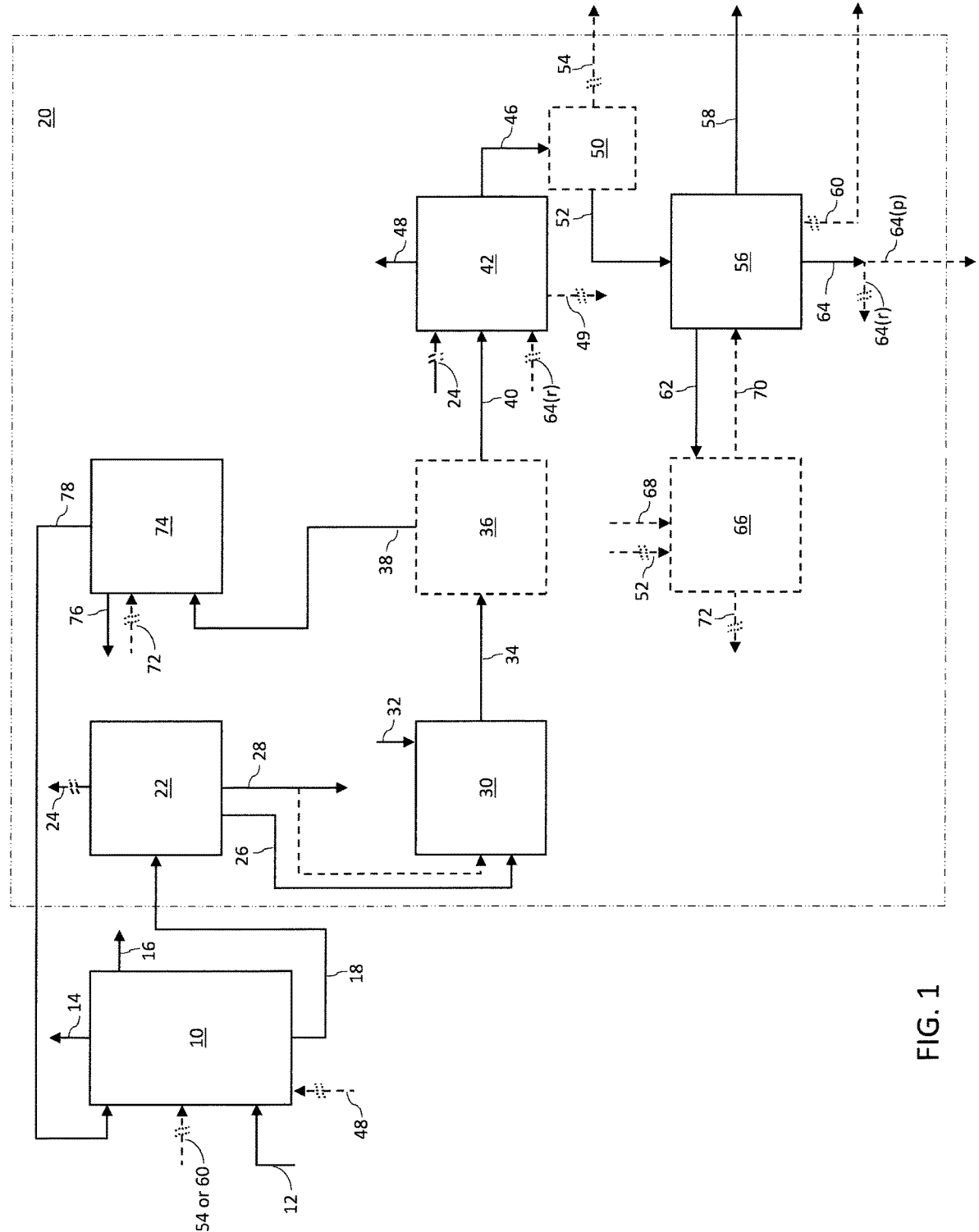
FIG. 1 is a process flow diagram of an embodiment of an integrated system including steam cracking and treatment of light PFO by selective hydrogenation, and ring opening and dealkylation, to produce BTX.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" with respect to a particular stream or plural streams means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include any crude oil produced worldwide. Examples are Arabian Heavy, Arabian Light, Arabian Extra Light, other Gulf crudes, Brent, North Sea crudes, North and West African crudes, Indonesian, Chinese crudes, or mixtures thereof. The crude petroleum mixtures can be whole range crude oil or topped crude oil. As used herein, "crude oil" also refers to such mixtures that have undergone some pretreatment such as water-oil separation; and/or gas-oil separation; and/or desalting; and/or stabilization. In certain embodiments, crude oil refers to any of such mixtures having an API gravity (ASTM D287 standard), of greater than or equal to about 10°, 20°, 30°, 32°, 34°, 36°, 38°, 40°, 42° or 44°.

The term "C # hydrocarbons" or "C #", is used herein having its well-known meaning, that is, wherein "#" is an integer value, and means hydrocarbons having that value of carbon atoms. The term "C #+ hydrocarbons" or "C #+" refers to hydrocarbons having that value or more carbon atoms. The term "C #-hydrocarbons" or "C #-" refers to hydrocarbons having that value or less carbon atoms. Similarly, ranges are also set forth, for instance, C1-C3 means a mixture comprising C1, C2 and C3. When "C #", "C #+" or "C #" are used in conjunction with "aromatics" they represent one-ring aromatics, diaromatics and/or other polyaromatics having that value of carbon atoms, that value or more carbon atoms, or that value or less carbon atoms. As used herein in describing mixed hydrocarbon streams, "C #" is not intended to represent a sharp cut-off but rather are used for convenience to describe the carbon number of a major portion of said stream. For example, a "C5" stream generally contains a major portion of C5 components and a minor portion of C4 and C6 components.

The term "petrochemicals" or "petrochemical products" refers to chemical products derived from crude oil that are not used as fuels. Petrochemical products include olefins and aromatics that are used as a basic feedstock for producing chemicals and polymers.

Typical olefinic petrochemical products include, but are not limited to, ethylene, propylene, butadiene, butylene-1, isobutylene, isoprene, cyclopentadiene and styrene. Typical aromatic petrochemical products include, but are not limited to, benzene, toluene, xylene, and ethyl benzene.

The term "olefin" is used herein having its well-known meaning, that is, unsaturated hydrocarbons containing at least one carbon-carbon double bond. In plural, the term "olefins" means a mixture comprising two or more unsaturated hydrocarbons containing at least one carbon-carbon double bond. In certain embodiments, the term "olefins" relates to a mixture comprising two or more of ethylene, propylene, butadiene, butylene-1, isobutylene, isoprene and cyclopentadiene.

The term "BTX" as used herein refers to the well-known acronym for benzene, toluene and xylenes.

The acronym "LPG" as used herein refers to the well-known acronym for the term "liquefied petroleum gas," and generally is a mixture of C3-C4 hydrocarbons. In certain embodiments, these are also referred to as "light ends."

The term "naphtha" as used herein refers to hydrocarbons boiling in the range of about 20-205, 20-193, 20-190, 20-180, 20-170, 32-205, 32-193, 32-190, 32-180, 32-170, 36-205, 36-193, 36-190, 36-180 or 36-170° C.

The term "light naphtha" as used herein refers to hydrocarbons boiling in the range of about 20-110, 20-100, 20-90, 20-88, 32-110, 32-100, 32-90, 32-88, 32-80, 36-110, 36-100, 36-90, 36-88 or 36-80° C.

The term "heavy naphtha" as used herein refers to hydrocarbons boiling in the range of about 80-205, 80-193, 80-190, 80-180, 80-170, 88-205, 88-193, 88-190, 88-180, 88-170, 90-205, 90-193, 90-190, 90-180, 90-170, 93-205, 93-193, 93-190, 93-180, 93-170, 100-205, 100-193, 100-190, 100-180, 100-170, 110-205, 110-193, 110-190, 110-180 or 110-170° C.

In certain embodiments naphtha, light naphtha and/or heavy naphtha refer to such petroleum fractions obtained by crude oil distillation, or distillation of intermediate refinery processes as described herein.

The terms "pyrolysis gasoline" and its abbreviated form "py-gas" are used herein having their well-known meaning, that is, thermal cracking products generally including aromatic, olefinic and paraffinic hydrocarbons in the range of C5s to C9s or even including C10, C11 and even some C12 hydrocarbons, for instance having an end boiling point in the range of about 170-210 or 170-215° C.

The terms "pyrolysis oil" and its abbreviated form "py-oil," and "pyrolysis fuel oil" and its abbreviated form "PFO," are used herein having their well-known meaning, that is, a heavy oil fraction, C9+, that is derived from steam cracking.

The terms "light pyrolysis oil" and its acronym "LPO" as used herein in certain embodiments refer to pyrolysis oil having an end boiling point of about 340, 360, 380 or 400° C.

The terms "heavy pyrolysis oil" and its acronym "HPO" as used herein in certain embodiments refer to pyrolysis oil having an initial boiling point of about 340, 360, 380 or 400° C.

The embodiments herein include processes and systems that integrate steam cracking with treatment of the PFO obtained from such steam cracking operations. The steam cracking feedstock can be selected from a treated crude oil stream and other treated heavy oil streams such as those in the atmospheric gas oil range, atmospheric residue range, vacuum gas oil range and/or vacuum residue range. The steam cracking feed is treated prior to steam cracking by hydroprocessing/hydrotreating and/or solvent deasphalting. The rejected PFO bottoms stream from the steam cracking unit contains large amount of polyaromatics (for example, with polyaromatics having an average molecular weight that varies between about 150 to 300 kg/kmol and higher), and is conventionally recovered as PFO for use as a fuel oil component. In the process disclosed herein, the PFO obtained from steam cracking of treated crude oil or other treated heavy oil feed is referred to as "refractory PFO." This refractory PFO contains a very high amount of polyaromatics, for instance, at least about 20, 30, 40, 50, or 60 wt % of poly-aromatics having three or more aromatic rings, and total poly-aromatics composition of at least about 50, 60, 70, 80, 90, or 94 wt %. The PFO is considered "refractory" due to its high content of polyaromatics hydrocarbons and heavier molecular weight components.

Refractory PFO is used as feedstock to produce additional BTX/BTEX, and co-produced LPG is recycled to the steam cracking zone as additional feed. BTX/BTEX production and refractory PFO treatment are integrated to minimize loss of aromatics to a fuel oil stream and maximize steam cracking feed. Overall operation efficiencies of steam cracking processes are increased. By converting the polyaromatics into useful chemical building blocks BTX/BTEX rather than combusting them as part of fuel oil, additional higher value products can be obtained from the integrated processes and systems herein. Further, co-produced LPG, and in certain embodiments naphtha-range byproducts, serve as additional steam cracker feed. These co-produced components can be introduced before hydroprocessing of the initial feed, before steam cracking of the hydroprocessed feed, or within the steam cracking. In certain operations, co-produced LPG, and in certain embodiments naphtha-range byproducts components, can pass to a pyrolysis section combined with heated hydroprocessed feed from a convection section of a steam cracking unit so that the light components bypass the convection section. In certain operations, co-produced LPG, and in certain embodiments naphtha-range byproducts components can pass to the convection section with the feed to the steam cracking unit.

Figure 2:
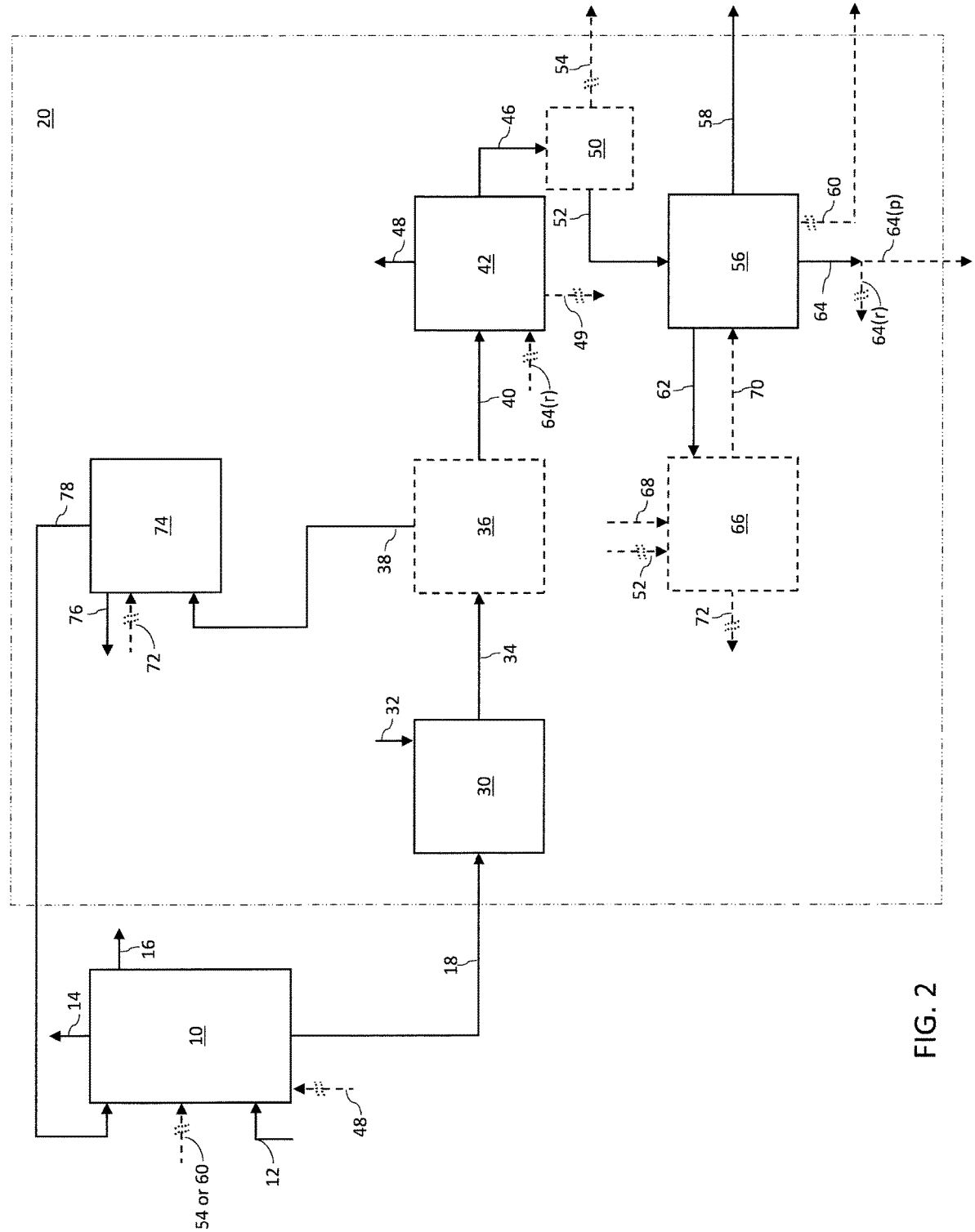
FIG. 2 is a process flow diagram of an embodiment of an integrated system including steam cracking and treatment of PFO by selective hydrogenation, and ring opening and dealkylation, to produce BTX.

FIGS. 1 and 2 are process flow diagrams of embodiments of integrated steam cracking processes and systems including refractory PFO treatment. The systems generally include a steam cracker/separation zone 10; a PFO treatment zone 20 including a selective hydrogenation zone 30, an optional separation zone 36, a ring-opening and dealkylation reaction zone 42, and a BTX splitting zone 56; and a gas treatment zone 74. In certain embodiments, a trans-alkylation zone 66 is also integrated in the PFO treatment zone 20. In the embodiment of FIG. 1 the PFO treatment zone 20 also includes a refractory PFO separation zone 22.

Selective ring-opening and dealkylation reaction occur in the absence of added hydrogen within the ring-opening and dealkylation reaction zone 42. The ring-opening and dealkylation reaction zone 42 includes one or more reactors effective for operation in the absence of added hydrogen, for instance including a fluidized bed reactor, a simulated moving-bed reactor, parallel reactor trains operating in swing mode, or other reaction vessel operating the absence of added hydrogen, and an associated separation zone, to produce a stream 48 containing light gases and C2-C5 compounds including paraffins, and a dealkylated stream 46 containing BTX components. In certain embodiments, if little hydrogen is produced within the ring-opening and dealkylation reaction, stream 48 also contains C2-C4 olefins. Other streams that can be removed if present (not shown) include a heavy C10+ aromatics stream, which can be purged and used, for instance, as fuel oil, recycled to the initial feed treatment zone upstream of the steam cracker (not shown), or recycled to the steam cracker (not shown). In certain embodiments, all, a substantial portion, a significant portion or a major portion of a heavy product stream from the ring-opening and dealkylation reaction zone 42 is recycled to the initial feed treatment zone upstream of the steam cracker.

The steam cracking reaction and separation zone is schematically shown at 10. The steam cracking reaction and separation zone includes heaters, furnaces, separation vessels and auxiliary units for steam cracking of an initial steam cracking feed 12 and recycle streams (including LPG and in certain embodiments one or more naphtha streams) created during one or more PFO treatment steps disclosed herein, for production of one or more mixed hydrocarbon product streams, and for separation generally into light gases, olefins, pygas and PFO. The steam cracking reaction separation occurs as is commonly known, for instance, using primary fractionating, quench separation and olefins recovery to generally obtain one or more C2, C3 and/or C4 olefins streams 14, a pygas (C5-C9 range) stream 16 and a PFO (C9+) stream 18. In operations in which the steam cracker is operable to treat an initial stream 12 including or consisting of treated crude oil and/or heavy feedstocks, a refractory PFO stream 18 is produced that is processed in accordance with embodiments described herein.

In the embodiments of FIG. 1, the steam cracking reaction and separation zone 10 is in fluid communication with the separation zone 22 to separate the PFO stream 18 into a first stream 24 containing C9+ aromatics compounds with one benzene ring (a "one-ring C9+" stream), a second stream 26 containing C10+ aromatics compounds with no less than 2 and up to 6 (typically between 2 and 4) benzene rings (a "two-ring C10+" stream), and a third stream 28 containing heavy C20+ polyaromatics such as those having 6 or more benzene rings (a "poly C20+" stream). In certain embodiments, a substantial portion, a significant portion or a major portion of PFO stream 18 produced from the steam cracking zone 10 is passed to the separation zone 22. The separation zone 22 can include one or more flash vessels and/or one or more simple or fractional distillation columns. Recovered streams from the separation zone 22 include the one-ring C9+ stream 24 containing hydrocarbons having a lower limit in the range of about 130-150° C. and an upper limit in the range of about 165-215° C., for instance, about 130-215, 140-215, 150-215, 130-180, 140-180, 150-180, 130-175, 140-175, 150-175, 130-165, 140-165 or 150-165° C., the two-ring C10+ stream 26 containing hydrocarbons having a lower limit in the range of about 165-215° C. and an upper limit in the range of about 350-430, for instance about 165-430, 175-430, 180-430, 215-430, 165-400, 175-400, 180-400, 215-400, 165-375, 175-375, 180-375, 215-375, 165-350, 175-350, 180-350, or 215-350° C., and the poly C20+ stream 28 containing hydrocarbons boiling above about the range of about 350-430, for instance above about 350, 375, 400 or 430° C.

The separation zone 22 is in fluid communication with the ring-opening and dealkylation reaction zone 42 to pass all or a portion of the one-ring C9+ stream 24, bypassing the selective hydrogenation zone 30. In certain embodiments, a substantial portion, a significant portion or a major portion of the one-ring C9+ stream 24 is passed from the separation zone 22 to the ring-opening and dealkylation reaction zone 42. The separation zone 22 is in fluid communication with the selective hydrogenation zone 30 to pass all or a portion of the two-ring C10+ stream 26 (also referred to as a light PFO two-ring C10+ stream). In certain embodiments, a substantial portion, a significant portion or a major portion of the two-ring C10+ stream 26 is passed from the separation zone 22 to the selective hydrogenation zone 30. In certain embodiments, the separation zone 22 is in fluid communication with a fuel oil pool or the initial feed treatment zone upstream of the steam cracker to pass all or a portion of the poly C20+ stream 28 (also referred to as a heavy PFO poly C20+ stream) for processing outside of the integrated system, for instance in a fuel oil blending step (not shown), or as a recycle stream to the initial feed treatment zone. In certain embodiments, all, a substantial portion, a significant portion or a major portion of the poly C20+ stream 28 is recycled to the initial feed treatment zone upstream of the steam cracker.

In certain embodiments (shown in dashed lines), the separation zone 22 is in fluid communication with the selective hydrogenation zone 30 to pass all or a portion of the poly C20+ stream 28. In embodiments in which all of the poly C20+ stream 28 is passed to the selective hydrogenation zone 30, the separation zone 22 may be operable to separate the PFO C9+ stream 18 into a one-ring C9+ stream 24 and a combined stream 26/28, containing the two-ring C10+ aromatic fraction with all components of the previously described two-ring C10+ stream 26 and the poly C20+ stream 28. The combined stream 26/28 is routed to the selective hydrogenation zone 30. In certain embodiments, a substantial portion, a significant portion or a major portion of the poly C20+ stream 28 is routed to the selective hydrogenation zone 30. In certain embodiments, 50-90 wt % of the poly C20+ stream 28 is routed to the selective hydrogenation zone 30.

In certain embodiments, with reference to FIG. 2, the separation zone 22 shown in FIG. 1 is not used, so that all or a portion of the full range of the C9+ PFO stream 18 is sent to the selective hydrogenation zone 30. In certain embodiments, a substantial portion, a significant portion or a major portion of the full range of the C9+ PFO stream 18 is routed to the selective hydrogenation zone 30. In these embodiments, the full range of PFO including heavy aromatics is sent through the selective hydrogenation zone 30.

The selective hydrogenation zone 30 is in fluid communication with stream 26, stream 26 and all or a portion of stream 28, or stream 18. The selective hydrogenation zone 30 contains one or more reactors in series or parallel arrangement operating under conditions effective for, and using catalyst effective for, selective hydrogenation of the polyaromatics compounds contained in stream 26, stream 26 and all or a portion of stream 28, or stream 18. A hydrogen stream 32 is in fluid communication with the reactor(s) at one or more locations as is known, and can be derived from recycled hydrogen from the integrated steam cracking unit (not shown in FIGS. 1 and 2) and produced hydrogen 76 from the gas treatment zone 74. A make-up hydrogen stream from another source (not shown) can also be in fluid communication with the reactor(s) at one or more locations as is known. Reaction conditions are set in the selective hydrogenation zone 30 to maximize the conversion of polyaromatics, such as naphthalene, methylnaphthalene, anthracene, naphtheno-diaromatics (three rings, one saturated and two aromatic), by selective hydrogenation into aromatic compounds with one benzene ring. The catalysts used in the selective hydrogenation zone can be, for instance, an acid or metal catalyst, and in certain embodiments dual functionality catalyst materials or a combination of catalyst materials having different functionalities of cracking and hydrogenation. An effluent stream 34 from the selective hydrogenation zone 30 contains one-ring C9+ aromatic compounds (also referred to as a "one-ring C9+ stream"), for instance, in a concentration range of about 30-90, 30-80, 30-70, 50-90, 50-80 or 50-70 wt % based on the total feed to the selective hydrogenation zone 30. LPG is a byproduct of this selective hydrogenation process LPG, and can be recovered together with hydrogen and other gases can (described below) or passed to the ring-opening and dealkylation reaction zone 42 as part of the effluent stream 34.

The ring-opening and dealkylation reaction zone 42 is in fluid communication with the effluent stream 34 from the selective hydrogenation zone 30. In certain embodiments of the ring-opening and dealkylation reaction zone 42, embodiments of which are described herein, the light stream 48 is produced which contains desirable light olefins. These light olefins can be recovered, passed to the steam cracking and separation zone 10, or a combination of these. In embodiments in which the stream 48 is passed to the steam cracking and separation zone 10, it can bypass the steam cracking section and pass with the steam cracking vapors in the associated olefins separation zone. All or a portion of the dealkylated stream 46 containing BTX and other generally heavier components is sent to the BTX splitting zone 56 for separation, and/or to the transalkylation zone 66 in embodiments in which transalkylation is integrated. In certain optional embodiments (shown in dashed lines), the dealkylated stream 46 can be passed to an aromatics separation unit 50, whereby an aromatics rich stream 52 (typically an extract stream) is passed to the BTX splitting zone 56, and an aromatics lean stream 54 (typically a raffinate stream) which can include C5 and non-aromatic C6 components (light wild naphtha) is separately processed. In certain embodiments, all, a substantial portion, a significant portion or a major portion of the aromatics lean stream 54 is recycled to the steam cracking zone 10.

In certain embodiments, the separation zone 36 is included between the selective hydrogenation zone 30 and the ring-opening and dealkylation reaction zone 42 for separation of the light gases, stream 38 including LPG and $H_2$, from the remainder of the one-ring C9+ effluent stream 34, stream 40. In certain embodiments, the separation zone 36 can be a fractionator associated with the selective hydrogenation reactor which operates similarly to a fractionator conventionally used in conjunction with a hydroprocessing zone. The LPG/$H_2$ stream 38 is passed to the gas treatment zone 74. The one-ring C9+ stream 40 having a light gas stream 38 removed is routed to the ring-opening and dealkylation reaction zone 42.

In certain embodiments, conditions and catalysts are selected in the selective hydrogenation zone 30 to minimize production of non-aromatic naphtha range products, and any naphtha including light naphtha is passed with the effluent stream 34 to the ring-opening and dealkylation reaction zone 42. In further embodiments, naphtha that is formed can be separated in the separation zone 36, and a separated naphtha stream can be in fluid communication with the steam cracking zone 10 as additional feed (not shown). In embodiments in which the separation zone 36 is not used, all or a portion of the one-ring C9+ effluent stream 34 can be routed to the ring-opening and dealkylation reaction zone 42 with the gases, that is, so that the gases are separated with the light gas stream 48 from the ring-opening and dealkylation reaction zone 42 and optionally passed to the gas treatment zone 74 or other suitable gas treatment and recovery zone.

In certain embodiments, all or some of the gas treatment steps for the LPG/$H_2$ stream 38 and the light gas stream 48, or the light gas stream 48 (in embodiments in which the separation zone 36 is not used), is accomplished by a separate gas treatment zone 74 as shown, or alternatively with other gas treatment operations. In certain embodiments, recovered hydrogen 76 is passed to hydrogen users in the integrated process and system. In certain embodiments, an LPG stream 78 obtained from stream 38 (as shown via the gas treatment zone 74) is passed to the steam cracker as additional feed (not shown). In other embodiments, the light gas streams 38 and 48, or stream 48, can be routed to gas treatment operations associated with the steam cracking and separation zone and/or gas treatment operations within a hydroprocessing unit used for treatment of the initial feed upstream of the steam cracking zone (not shown).

In certain optional embodiments (shown in dashed lines), the effluent 46 can be passed to an aromatics separation unit 50, whereby an aromatics rich stream 52 (typically an extract stream) is passed to the BTX splitting zone 56, and an aromatics lean stream 54 (typically a raffinate stream) which can include C5 and non-aromatic C6 components (light wild naphtha) is separately processed. In certain embodiments, all, a substantial portion, a significant portion or a major portion of the aromatics lean stream 54 is recycled to the steam cracking zone 10.

The BTX splitting zone 56 separates the dealkylated stream 46 containing BTX and other generally heavier components into a BTX product stream 58, which can be one or more streams that are typically passed to a BTX complex (not shown) for separation into C6, C7 and C8 streams, benzene, toluene and one more xylene products (BTX), and in certain embodiments benzene, toluene, one more xylene products and ethylbenzene (BTXE). The BTX splitting zone 56 can include one or more simple or fractional distillation columns.

In certain optional embodiments (shown in dashed lines), the BTX splitting zone 56 is operable to remove at least a portion of non-aromatic content from the dealkylated BTX+ stream 46, for instance by including an aromatics extraction step, and an aromatics lean stream 60 (typically a raffinate stream) which can include non-aromatic components, including C5 and non-aromatic C6 components (light wild naphtha), is recovered and separately processed. In certain embodiments, all, a substantial portion, a significant portion or a major portion of the aromatics lean stream 60 is recycled to the steam cracking zone 10.

In other optional embodiments the aromatics separation unit 50 is included upstream of the BTX splitting zone 56 for removing the aromatics lean stream 54 containing non-aromatic components from the feeds to the BTX splitting zone 56, including C5 and non-aromatic C6 components (light wild naphtha), and the aromatics rich stream 52 is passed to the BTX splitting zone 56.

In certain embodiments, a C9 stream 62 is recovered, which includes trimethyl-benzene, methylethylbenzene, and other C9 compounds. In additional embodiments, the C9 stream 62 is passed to a transalkylation zone 66 to further produce BTX via transalkylation reactions, shown as a BTX stream 70.

A heavy product stream 64 from the BTX splitting zone 56 (a C10+ fraction) can be purged as stream 64(*p*) and used, for instance, as fuel oil, recycled back to the ring-opening and dealkylation reaction zone 42 for further conversion as stream 64(*r*), recycled to the initial feed treatment zone upstream of the steam cracker (not shown), recycled to the steam cracker (not shown), or a combination of these. In certain embodiments, all, a substantial portion, a significant portion or a major portion of the heavy product stream 64 recycled as stream 64(*r*) to the ring-opening and dealkylation reaction zone 42 for further conversion into BTX and C9s. In certain embodiments, all, a substantial portion, a significant portion or a major portion of the heavy product stream 64 recycled to the initial feed treatment zone upstream of the steam cracker. In certain embodiments, all, a substantial portion, a significant portion or a major portion of the heavy product stream 64 recycled to the steam cracker.

In embodiments in which a transalkylation step is integrated, the transalkylation zone 66 operates in the presence of hydrogen, stream 68, to catalytically convert the C9+ aromatic stream 62 into additional BTX components, stream 70, through transalkylation and disproportionation reactions. In certain embodiments (not shown) all or a portion of benzene and/or toluene recovered from stream 58, or benzene and/or toluene from another source, is also introduced to the transalkylation zone 66 for production of additional xylenes. In the integrated process and system herein, the light gases by-product stream 72 from the transalkylation zone 66, including $C_1$-$C_4$ and hydrogen, is routed to the gas treatment zone 74 (or alternatively to the steam cracker/separation zone 10, not shown), and the effluent stream 70 containing BTX is passed back to the BTX splitting zone 56. In certain optional embodiments, the effluent stream 70 is passed to an aromatics extraction step within the BTX splitting zone 56 and non-aromatic components are included with an aromatics lean stream 60. In certain optional embodiments, the effluent stream 70 can be passed to an aromatics separation unit, for instance unit 50 or a separate extraction unit, whereby an aromatics rich stream (typically an extract stream) is passed back to the BTX splitting zone 56, and an aromatics lean stream (typically a raffinate stream), which can include C5 and non-aromatic C6 components (light wild naphtha), is recovered and separately processed. In certain embodiments, all, a substantial portion, a significant portion or a major portion of the aromatics lean stream derived from the transalkylation effluent stream 70 is recycled to the steam cracking zone 10.

The gas treatment zone 74 collects light gas streams from the integrated process and system including from the transalkylation zone (stream 72) and/or from the selective hydrogenation zone (stream 38 from the optional separation zone 36). The gas treatment zone 74 can be a suitable known system including hydrogen purification units, such as a pressure swing adsorption (PSA) unit to obtain a hydrogen stream 76 having a purity of 99.9%+, or a membrane separation unit to obtain a hydrogen stream 76 with a purity of about 95%. In certain embodiments, the gas treatment zone 74 is also configured and arranged for recovery of naphtha range products, such as light naphtha. LPG and heavier components, stream 78, is passed to the steam cracking zone 10. Recovered hydrogen, stream 76, is sent to one or more of the hydrogen users in the integrated process and system.

Steam pyrolysis is a relatively complex process employing very high temperatures, high flow rates and production of large amounts of flammable gases. Steam cracker arrangements are well known and typically include several furnaces which are divided in a radiation (or pyrolysis) section, and a convection section. In a typical configuration, vaporization of the feed occurs in the convection section, recovering the flue gases heat from the radiation section. Vaporization is facilitated by mixing the hydrocarbons and steam. Steam is also produced in the convection section. Typically steam to oil ratio values range from about 0.3:1.0 to about 1.0:1.0, with the lower end suitable for lighter feeds such as ethane and the higher end suitable for heavier feeds. In steam cracking of heavier feeds including treated crude oil, the steam to oil ratio can be as high as 1:0:1:0 to 5:0:1:0. Steam cracker furnaces maximize recovery of flue gas energy via production of high pressure steam, which can be recovered for use elsewhere in the refinery and/or petrochemical operations.

The thermal cracking reactions occur mainly in the radiation section, typically at a set of coils. The number and shape of coils depend of the type of feed, and varies, for instance, depending on the selected configuration. Hydrocarbon steam cracking is an endothermic reaction that commences at coil inlet temperature (CIT), for instance, in the range of about 600-650° C., and finishes at a coil outlet temperature (COT), for instance, in the range of about 800-850° C. The values of the CIT and COT vary, for instance, +/−25%, based on factors such as the severity of the operation, the type of feed and the selected configuration. The furnaces are followed in the process by a temperature quench down targeting to halt thermal cracking reactions and to avoid recombination of olefins. Following quenching the coil effluent is routed to a separation section to produce hydrogen, which is can be recovered for use elsewhere in the refinery and/or petrochemical operations or used as fuel gas in the steam cracker furnaces, methane which is used as fuel gas in the steam cracker furnaces, ethylene as desired olefin product, propylene as desired olefin product, a mix of C4 olefins (butadiene, isobutene, butenes) and normal and iso butanes, a pyrolysis gasoline stream rich in aromatics and a PFO stream. Purified hydrogen gas can also be recovered with an integrated hydrogen purification system, for instance using a pressure swing adsorption (PSA) unit to obtain a hydrogen stream having a purity of 99.9%+, or a membrane separation unit to obtain a hydrogen stream with a purity of about 95%. In certain embodiments, the gas treatment zone 74 described above associated with the PFO treatment steps could be integrated with gas treatment operations for steam cracker products.

Units that are included in separation section include a primary fractionator after quench, water tower(s), gas compressor(s), a cold box and a series of distillations columns such as a demethanizer, deethanizer, ethylene-ethane splitter, depropanizer and propane-propylene splitter. The ethane and propane produced are typically recycled to the furnaces to extinction.

While a generalized description is provided above for steam cracking, it should be appreciated that other arrangements and conditions used for thermal cracking that produce the refractory PFO streams described herein can benefit from integration of the PFO treatments steps herein. In certain embodiments the feed to the steam cracker can be part of an integrated process and system as disclosed in commonly owned U.S. Pat. No. 9,255,230 (and its related U.S. Pat. Nos. 9,587,185 and 10,017,704), U.S. Pat. No. 9,284,497 (and its related U.S. Pat. No. 10,221,365), U.S. Pat. No. 9,279,088 (and its related U.S. Pat. No. 10,329,499), U.S. Pat. No. 9,296,961 (and its related U.S. Pat. No. 10,344,227), U.S. Pat. No. 9,284,502 (and its related U.S. Pat. No. 10,246,651), U.S. Pat. No. 9,382,486 (and its related U.S. Pat. No. 10,233,400), U.S. Pat. Nos. 9,228,139, 9,228,140, 9,228,141 and 9,284,501 (and its related U.S. Pat. Nos. 9,771,530 and 10,011,788), which are all incorporated by reference herein in their entireties.

In certain embodiments, a crude oil stream is fed to a hydrotreating zone, such as a fixed bed or slurry bed reactor in the presence of hydrogen, where the crude oil is hydrotreated to remove S, N, and other impurities. The gas and liquid product are separated, and a stripper is used to remove $H_2S$ and $NH_3$ from other gas products. In certain embodiments of the processes disclosed in the above-mentioned commonly owned patents, treated crude oil is used as the feedstock to a steam cracker. In certain embodiments of the processes disclosed in the above-mentioned commonly owned patents, a heavy fraction of treated crude oil is used as steam cracker feedstock. In certain embodiments, a feedstock hydroprocessing zone carries out selective hydroprocessing or hydrotreating of the initial feed that can increase the paraffin content (or decrease the BMCI) of a feedstock by saturation followed by mild hydrocracking of aromatics, especially polyaromatics. In certain embodiments, when hydrotreating a crude oil or other heavy oil feed, contaminants such as metals, sulfur and nitrogen can be removed by passing the feedstock through a series of layered catalysts that perform the catalytic functions of demetallization, desulfurization and/or denitrogenation, for example as disclosed in commonly owned U.S. Pat. No. 9,255,230 (and its related U.S. Pat. Nos. 9,587,185 and 10,017,704). In certain embodiments, hydrotreating a crude oil or other heavy oil feed to remove contaminants such as metals, sulfur and nitrogen is accomplished by slurry hydroprocessing as disclosed in commonly owned U.S. Pat. No. 9,284,501 (and its related U.S. Pat. Nos. 9,771,530 and 10,011,788). In certain embodiments, hydrotreating a crude oil or other heavy oil feed to remove contaminants such as metals, sulfur and nitrogen is preceded by solvent deasphalting, as disclosed in commonly owned U.S. Pat. No. 9,284,502 (and its related U.S. Pat. No. 10,246,651). In certain embodiments, the hydroprocessed effluent from hydrotreating a crude oil or other heavy oil feed to remove contaminants such as metals, sulfur and nitrogen is subjected to solvent deasphalting, as disclosed in commonly owned U.S. Pat. No. 9,382,486 (and its related U.S. Pat. No. 10,233,400).

For instance, in one embodiment, a crude oil or other heavy oil feedstock and an effective amount of hydrogen, are charged to a hydroprocessing reaction zone operating generally at a temperature in the range of from 300-450° C. In certain embodiments, the hydroprocessing reaction zone includes one or more unit operations. In certain embodiments, the feed is crude oil and the operations are as described in commonly owned US Patent Publication 2011/0083996 and in PCT Patent Application Publications WO2010/009077, WO2010/009082, WO2010/009089 and WO2009/073436, all of which are incorporated by reference herein in their entireties. The crude oil feedstock hydroprocessing zone can include one or more beds containing an effective amount of hydrodemetallization catalyst, and one or more beds containing an effective amount of hydroprocessing catalyst having hydrodearomatization, hydrodenitrogenation, hydrodesulfurization and/or hydrocracking functions. In additional embodiments the feedstock hydroprocessing zone includes more than two catalyst beds. In further embodiments a feedstock hydroprocessing zone includes plural reaction vessels each containing one or more catalyst beds, for example, of different function. The reaction vessels(s) in the feedstock hydroprocessing zone operates under parameters effective to hydrodemetallize, hydrodearomatize, hydrodenitrogenate, hydrodesulfurize and/or hydrocrack the crude oil feedstock. In certain embodiments, hydroprocessing is carried out using the following conditions: operating temperature in the range of from about 300-450° C.; operating pressure in the range of from about 30-180 kg/cm$^2$; and a liquid hour space velocity in the range of from 0.1-10 h$^{-1}$. In embodiments using crude oil as the initial feed to the feedstock hydroprocessing zone, certain advantages are realized as compared to the same hydroprocessing unit operation employed for atmospheric residue. For instance, at a start of run temperature in the range of 370-375° C., the deactivation rate is around 1° C. per month. In contrast, if residue were to be processed, the deactivation rate would be closer to about 3 to 4° C. per month. The treatment of atmospheric residue typically employs pressure of around 200 kg/cm$^2$ whereas the present process in which crude oil is treated can operate at pressures as low as 100 kg/cm$^2$. Additionally, to achieve the high level of saturation required for the increase in the hydrogen content of the feed, this process can be operated at a high throughput when compared to atmospheric residue. The LHSV can be as high as 0.5 hr$^{-1}$ while that for atmospheric residue is typically 0.25 hr$^{-1}$. The deactivation rate when hydroprocessing crude oil is going in the inverse direction from that which is usually observed. Deactivation at low throughput (0.25 hr$^{-1}$) is 4.2° C. per month and deactivation at higher throughput (0.5 hr$^{-1}$) is 2.0° C. per month; this can be attributed to the washing effect of the catalyst.

Reactor effluents from the feedstock hydroprocessing zone are typically cooled in an exchanger and sent to a high pressure cold or hot separator. Separator tops are cleaned in an amine unit and the resulting hydrogen rich gas stream is passed to a recycling compressor and can be used as a recycle gas in the feedstock hydroprocessing reaction zone. Separator bottoms from the high pressure separator, which are in a substantially liquid phase, are cooled and then introduced to a low pressure cold separator. Remaining gases, including hydrogen, $H_2S$, $NH_3$ and any light hydrocarbons, which can include $C_1$-$C_4$ hydrocarbons, can be conventionally purged from the low pressure cold separator and sent for further processing, such as flare processing or fuel gas processing. In certain embodiments of the present process, hydrogen is recovered by combining low pressure separator gases with gases in the steam cracker products. The hydroprocessed effluent contains a reduced content of contaminants (such as metals, sulfur and nitrogen), an increased paraffinicity, reduced BMCI, and an increased American Petroleum Institute (API) gravity.

In one embodiment, the sequence of catalysts to perform hydrodemetallization (HDM) and hydrodesulfurization (HDS) is as follows: (i) A hydrodemetallization catalyst.

The catalyst in the HDM section are generally based on a gamma alumina support, with a surface area of about 140-240 m$^2$/g. This catalyst is best described as having a very high pore volume, for example, in excess of 1 cm$^3$/g. The pore size itself is typically predominantly macroporous. This is required to provide a large capacity for the uptake of metals on the catalysts surface and optionally dopants. Typically, the active metals on the catalyst surface are sulfides of nickel and molybdenum in the ratio Ni/Ni+Mo<0.15. The concentration of nickel is lower on the HDM catalyst than other catalysts as some nickel and vanadium is anticipated to be deposited from the feedstock itself during the removal, acting as catalyst. The dopant used can be one or more of phosphorus (see, for example, US Patent Publication US 2005/0211603 which is incorporated by reference herein), boron, silicon and halogens. The catalyst can be in the form of alumina extrudates or alumina beads. In certain embodiments alumina beads are used to facilitate un-loading of the catalyst HDM beds in the reactor as the metals uptake will range between from 30 to 100% at the top of the bed. (ii) An intermediate catalyst can also be used to perform a transition between the HDM and HDS function. It has intermediate metals loadings and pore size distribution. The catalyst in the HDM/HDS reactor is essentially alumina based support in the form of extrudates, optionally at least one catalytic metal from the Periodic Table of the Elements IUPAC Group 6 (for example, molybdenum and/or tungsten), and/or at least one catalytic metal from the Periodic Table of the Elements IUPAC Groups 9 or 10 (for example, nickel and/or cobalt). The catalyst also contains optionally at least one dopant selected from boron, phosphorous, halogens and silicon. Physical properties include a surface area of about 140-200 $m^2/g$, a pore volume of at least 0.6 $cm^3/g$ and pores which are mesoporous and in the range of 12 to 50 nm. (iii) The catalyst in the HDS section can include those having gamma alumina based support materials, with typical surface area towards the higher end of the HDM range, for example about ranging from 180-240 $m^2/g$. This required higher surface for HDS results in relatively smaller pore volume, for example, lower than 1 $cm^3/g$. The catalyst contains at least one element from the Periodic Table of the Elements IUPAC Group 6, such as molybdenum and at least one element from the Periodic Table of the Elements IUPAC Groups 9 or 10, such as nickel. The catalyst also comprises at least one dopant selected from boron, phosphorous, silicon and halogens. In certain embodiments cobalt is used to provide relatively higher levels of desulfurization. The metals loading for the active phase is higher as the required activity is higher, such that the molar ratio of Ni/Ni+Mo is in the range of from 0.1 to 0.3 and the (Co+Ni)/Mo molar ratio is in the range of from 0.25 to 0.85. (iv) A final catalyst (which could optionally replace the second and third catalyst) is designed to perform hydrogenation of the feedstock (rather than a primary function of hydrodesulfurization), for instance as described in Appl. Catal. A General, 204 (2000) 251. The catalyst will be also promoted by Ni and the support will be wide pore gamma alumina. Physical properties include a surface area towards the higher end of the HDM range, for example, 180-240 $m^2/g$ This required higher surface for HDS results in relatively smaller pore volume, for example, lower than 1 $cm^3/g$.

In certain embodiments the bottoms stream from the low pressure cold separator is the feed to the steam pyrolysis zone. In additional embodiments, bottoms from the low pressure separator are sent to a separation zone wherein heavy materials such as those in the atmospheric or vacuum residue range are removed from the system, and the remainder is passed to the steam pyrolysis zone. In further embodiments, bottoms from the low pressure separator are sent to a separation zone wherein a light portion bypasses all or a portion of the steam pyrolysis zone, and a heavy portion serves as feed to a convection section of a steam pyrolysis zone. The separation zone can include a suitable separation unit operation such as a flash vessel or distillation column that separates based on boiling point, a separation device based on physical or mechanical separation of vapors and liquids, or a combination including at least one of these types of devices.

FIGS. 3-6 schematically depict embodiments of steam cracking systems integrating pretreatment of the feed. The steam cracking zone 10 operates as described above and is schematically shown as including a steam cracking convection section 102 and a steam cracking pyrolysis section 112. The steam cracking feed 12 (which can be a hydroprocessed initial feed 126 as in FIG. 3; a hydroprocessed initial feed having a bottom fraction removed, stream 136 as in FIG. 4; a hydroprocessed initial feed having tops removed, stream 144 as in FIG. 5; or a deasphalted stream 156 as in FIG. 6) is passed to the steam cracking convection section 102 along with steam for vaporization of the feed.

A heated stream 104 is passed to the steam cracking pyrolysis section 112 for thermal cracking reactions and to produce a thermally cracked mixed product stream 114. In certain embodiments, a separation zone 106 is included between the steam cracking convection section 102 and the steam cracking pyrolysis section 112. A light portion, stream 108 from the separation zone 106, is passed to the steam cracking pyrolysis section 112, and a heavy portion 110 is discharged. The thermally cracked mixed product stream 114 is passed to a steam cracking effluent separation zone 116 which can operate as is commonly known, for instance, using primary fractionating, quench separation and olefins recovery to generally obtain one or more C2, C3 and/or C4 olefins streams 14, a pygas (C5-C9 range) stream 16 and a PFO (C9+) stream 18. In certain embodiments, the steam cracking effluent separation zone 116 also includes or is integrated with a suitable hydrogen purification units, such as a pressure swing adsorption (PSA) unit to obtain a hydrogen stream 118 having a purity of 99.9%+, or a membrane separation unit to obtain a hydrogen stream 118 with a purity of about 95%. Methane (not shown) can also be recovered and used as fuel gas in the steam cracker furnaces or other fuel gas users within the integrated system. The PFO stream 18 is passed to a PFO treatment zone 20.

Figure 3:
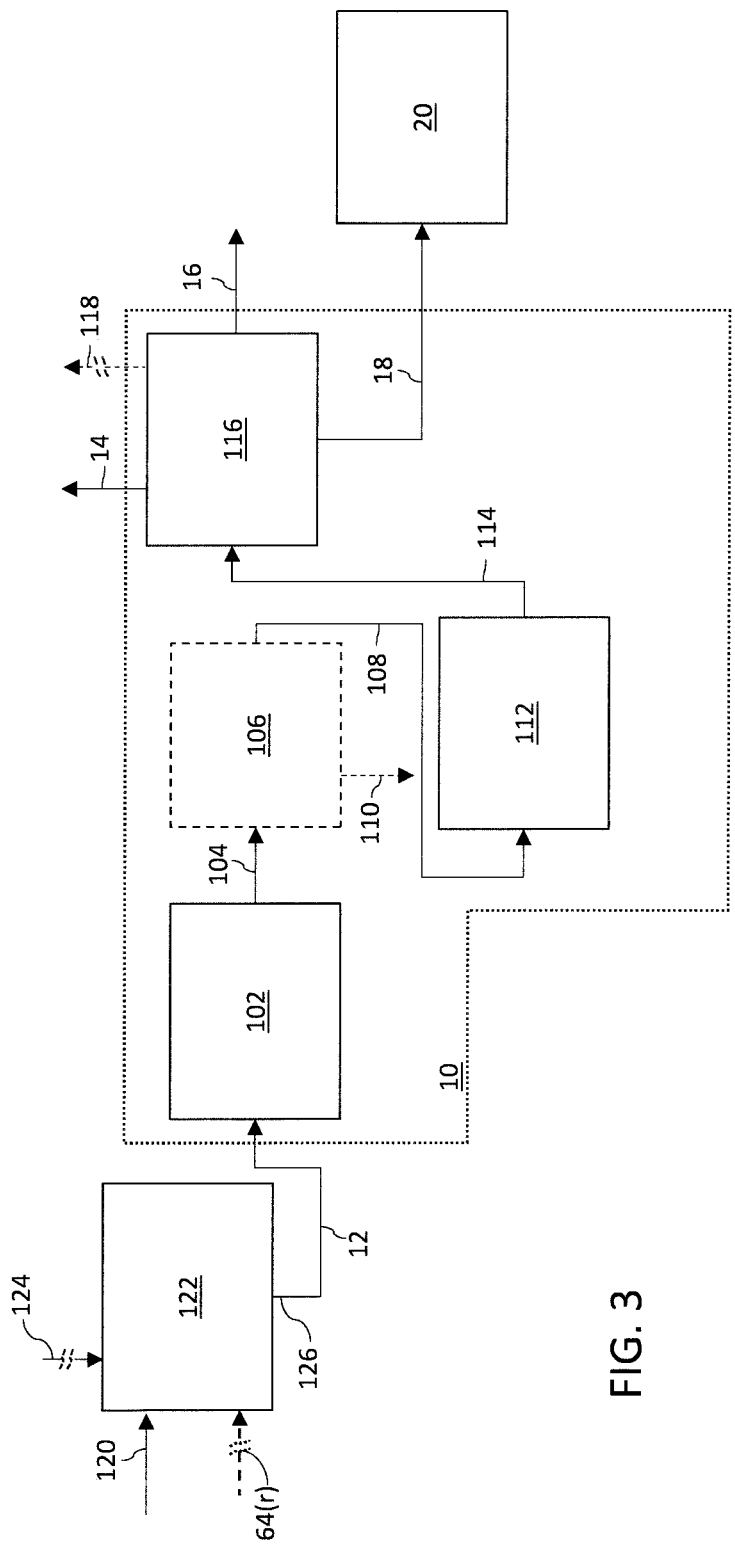

In one embodiment, with reference to FIG. 3, a schematic process flow diagram of a feedstock hydroprocessing zone and a steam cracking zone is shown, including a feedstock hydroprocessing zone 122 for treating an initial feedstock 120 (and optionally a recycle stream 64(r) as described herein) in the presence of hydrogen, shown as hydrogen stream 124, to produce a hydroprocessed effluent stream 126 that serves as the steam cracking feed 12. As noted herein, the effluent can be subjected to a high pressure cold or hot separator to obtain a hydrogen rich gas stream that is used as a recycle gas in the reactor of the feedstock hydroprocessing zone 122. A separator bottoms stream from the high pressure separator, in a substantially liquid phase, is cooled and then introduced to a low pressure cold separator. A separator bottoms stream from the low pressure separator, in a substantially liquid phase, is the stream 126 that serves as the steam cracking feed 12.

Figure 4:
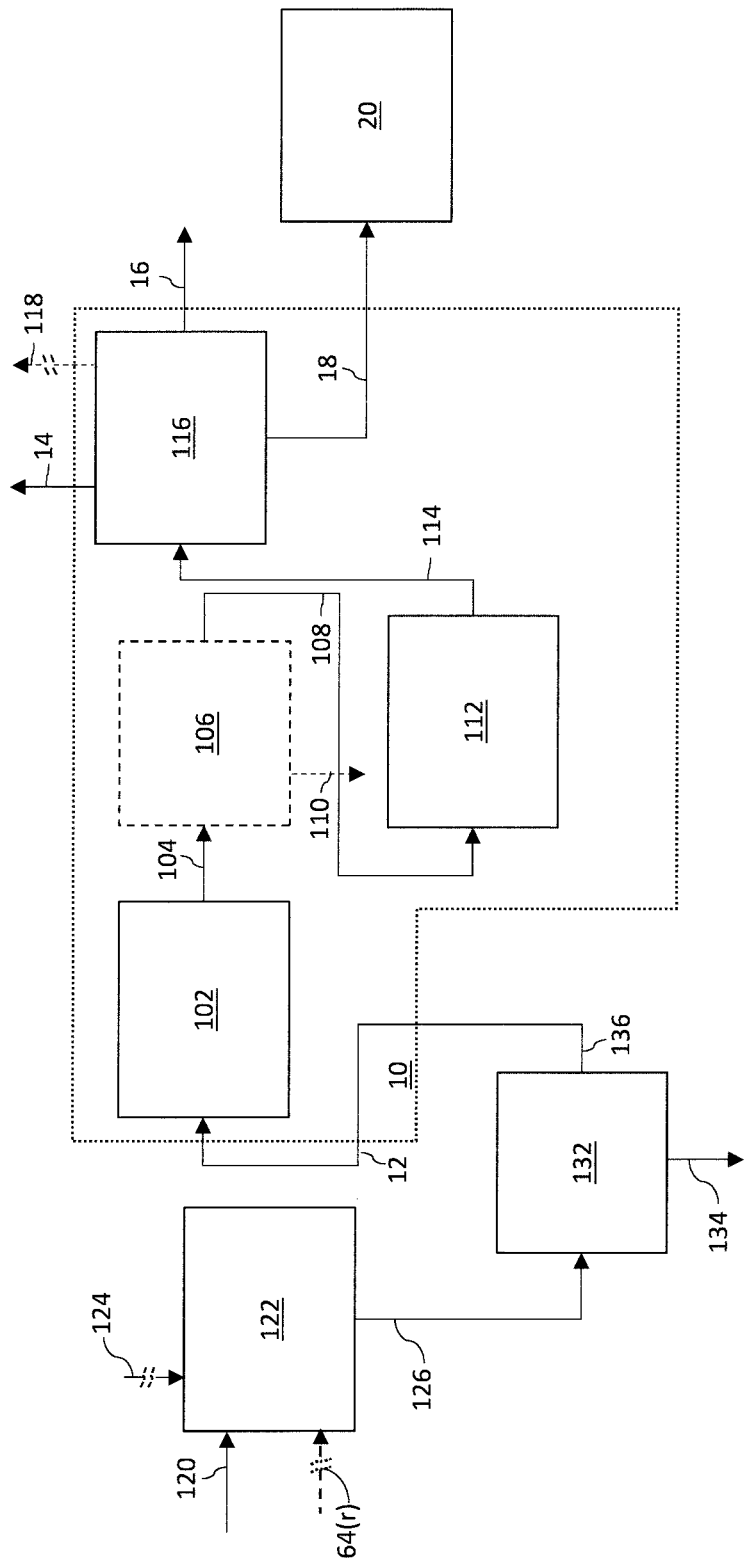

In another embodiment, with reference to FIG. 4, a schematic process flow diagram of a feedstock hydroprocessing zone and a steam cracking zone is shown, including a feedstock hydroprocessing zone 122 for treating an initial feedstock 120 (and optionally a recycle stream 64(r) as described herein) in the presence of hydrogen, shown as hydrogen stream 124, to produce a hydroprocessed effluent stream 126. The hydroprocessed effluent is passed to a separation zone 132 upstream of the steam cracking zone to remove heavy components such as residual range components as a stream 134, and the remainder of the bottomless feed, in certain embodiments bottomless crude oil, stream 136, serves as the steam cracking feed 12. The hydroprocessed effluent can be subjected to a high pressure cold or hot separator to obtain a hydrogen rich gas stream that is used as a recycle gas in the reactor of the feedstock hydroprocessing zone 122. A separator bottoms stream from the high pressure separator, in a substantially liquid phase, is cooled and then introduced to a low pressure cold separator. A separator bottoms stream from the low pressure separator, in a substantially liquid phase, is the stream 126 that is passed to the separation zone 132 to remove residual range components as a heavy stream 134; the remaining stream 136 serves as the steam cracking feed 12. In certain embodiments the heavy stream 134 has an initial boiling point corresponding to vacuum residue, for instance in the range of about 500-550, 500-540, 500-530, 510-550, 510-540 or 510-530° C. The bottomless stream 136 can have, for instance, an initial boiling point corresponding to that of the stream 126 and an end boiling point corresponding to the initial boiling point of the heavy stream 134.

Figure 5:
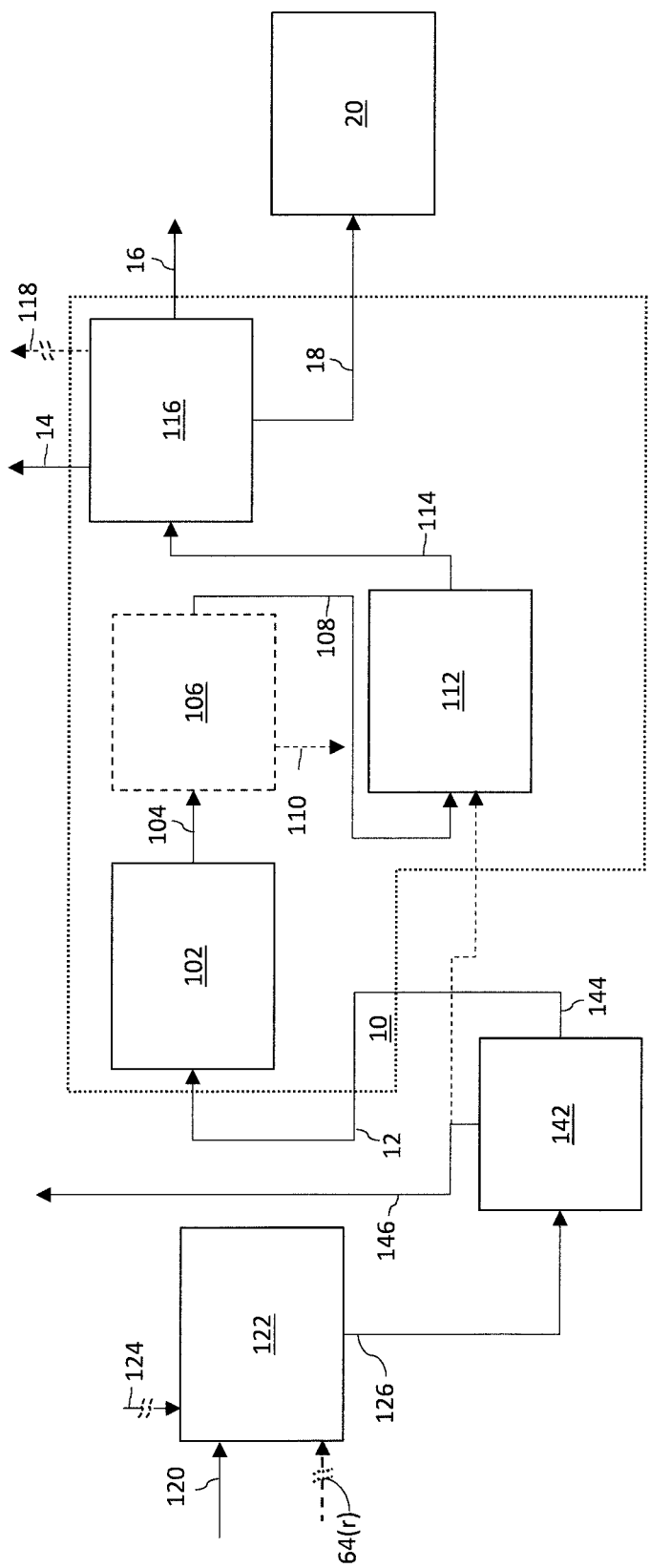

In another embodiment, with reference to FIG. 5, a schematic process flow diagram of a feedstock hydroprocessing zone and a steam cracking zone is shown, including a feedstock hydroprocessing zone 122 for treating an initial feedstock 120 (and optionally a recycle stream 64(r) as described herein) in the presence of hydrogen, shown as hydrogen stream 124, to produce a hydroprocessed effluent stream 126. The hydroprocessed effluent is passed to a separation zone 142 upstream of the steam cracking zone to remove light components, stream 146, and the remaining heavy components, in certain embodiments a topped hydroprocessed initial feed, stream 144, serves as the steam cracking feed 12. The hydroprocessed effluent can be subjected to a high pressure cold or hot separator to obtain a hydrogen rich gas stream that is used as a recycle gas in the reactor of the feedstock hydroprocessing zone 122. A separator bottoms stream from the high pressure separator, in a substantially liquid phase, is cooled and then introduced to a low pressure cold separator. A separator bottoms stream from the low pressure separator, in a substantially liquid phase, is the stream 126 that is passed to the separation zone 142 to separate remove light components, stream 146; the remainder, stream 144, serves as the steam cracking feed 12. In certain embodiments the stream 146 has an end boiling point corresponding to that of naphtha or light naphtha, and the stream 144 has an initial boiling point corresponding to the end boiling point of the stream 146.

In the embodiments of FIGS. 3, 4 and 5, the initial feedstock 120 can be as described herein, for instance selected from crude oil and other heavy oil streams such as those in the atmospheric gas oil range, atmospheric residue range, vacuum gas oil range and/or vacuum residue range.

In another embodiment, with reference to FIG. 6, a schematic process flow diagram of a feedstock deasphalting zone and a steam cracking zone is shown, including a feedstock deasphalting zone 152 for treating a deasphalting feedstock 154 (and optionally a recycle stream 64(r) as described herein) to produce a deasphalted oil stream 156 and an asphalt phase stream 158. In certain embodiments, the deasphalting feedstock 154 can be an initial feed as described herein, for instance selected from a treated crude oil stream and other treated heavy oil streams such as those in the atmospheric gas oil range, atmospheric residue range, vacuum gas oil range and/or vacuum residue range. In certain embodiments, the deasphalting feedstock 154 can be all or a portion of a hydroprocessed effluent, for instance, a hydroprocessed initial feed 126 as described with respect to FIG. 3; a hydroprocessed initial feed having a bottom fraction removed, stream 136 as described with respect to FIG. 4; or a hydroprocessed initial feed having tops removed, stream 144 as described with respect to FIG. 5. In further embodiments, the deasphalting feedstock 154 can be an initial feed as described herein, and the deasphalted oil stream 156 is passed to an optional hydroprocessing zone, schematically shown as zone 162. For instance, the deasphalted oil stream 156 can serve as the initial feed 120 in the integrated systems described with respect to FIGS. 3, 4 and 5. In certain embodiments, the optional zone 162 can be a separation zone, for instance that operates similar to the pre-steam cracking separation zone 132 described with respect to FIG. 4 to pass a bottomless stream 136 as the steam cracking feed 12, or similar to the pre-steam cracking separation zone 142 described with respect to FIG. 5 to pass a topped feed 144 as the steam cracking feed 12.

In embodiments in which solvent deasphalting is employed prior to the steam cracking zone (either before hydroprocessing of the initial feed, between hydroprocessing of the initial feed and steam cracking, or in the absence of hydroprocessing of the initial feed), solvent deasphalting can be carried out with paraffin streams having carbon number ranging from 3-7, in certain embodiments ranging from 4-5, at conditions that are below the critical temperature and pressure conditions of the solvent. The feed is mixed with the light paraffinic solvent, where the deasphalted oil is solubilized in the solvent. The insoluble pitch will precipitate out of the mixed solution and is separated from the DAO phase (solvent-DAO mixture) in the extractor. Solvent deasphalting is carried-out in liquid phase and therefore the temperature and pressure are set accordingly. There are typically two stages for phase separation in solvent deasphalting. In the first separation stage, the temperature is maintained lower than that of the second stage to separate the bulk of the asphaltenes. The second stage temperature is maintained to control the deasphalted/demetalized oil (DA/DMO) quality and quantity. The temperature impacts the quality and quantity of DA/DMO. An increase in the extraction temperature will result in a decrease in deasphalted/demetalized oil yield, which means that the DA/DMO will be lighter, less viscous, and contain less metals, asphaltenes, sulfur, and nitrogen. A temperature decrease will have the opposite effects. In general, the DA/DMO yield decreases, having higher quality, by raising extraction system temperature; and increases, having lower quality, by lowering extraction system temperature. The composition of the solvent is an important process variable. The solubility of the solvent increases with increasing critical temperature, generally according to $C3<iC4<nC4<iC5$. An increase in critical temperature of the solvent increases the DA/DMO yield. However, it should be noted that the solvent having the lower critical temperature has less selectivity resulting in lower DA/DMO quality. The volumetric ratio of the solvent to the solvent deasphalting unit charge impacts selectivity and to a lesser degree on the DA/DMO yield. Higher solvent-to-oil ratios result in a higher quality of the DA/DMO for a fixed DA/DMO yield. Higher solvent-to-oil ratio is desirable due to better selectivity. The composition of the solvent will also help to establish the required solvent to oil ratios. The required solvent to oil ratio decreases as the critical solvent temperature increases. The solvent to oil ratio is, therefore, a function of desired selectivity, operation costs and solvent composition.

The selective hydrogenation zone 30 includes an effective reactor configuration with the requisite reaction vessel(s), feed heaters, heat exchangers, hot and/or cold separators, product fractionators, strippers, and/or other units to process all or a portion of the two-ring C10+ stream 26 from the PFO separation zone 22, or all or a portion of the PFO C9+ stream 18 from the steam cracker/separation zone 10. The selective hydrogenation zone 30 generally contains one or more fixed bed, fluidized bed, ebullated bed, slurry bed, moving bed, continuous stirred tank, or tubular reactors, in series or parallel arrangement, which is/are generally operated in the presence of hydrogen under conditions, and utilizes catalyst(s), effective for selective hydrogenation of polyaromatics compounds in the two-ring C10+ stream 26. In certain embodiments, multiple reactors can be provided in parallel in hydrogenation zone 30 to facilitate catalyst replacement and/or regeneration. The selective hydrogenation zone 30 generally has one or more inlets in fluid communication with a source of feedstock. In certain embodiments, the feedstock is all or a portion of the light PFO two-ring C10+ stream 26 from the PFO separation zone 22 (as disclosed in conjunction with the embodiment of FIG. 1). In certain embodiments, the feedstock is all or a portion of the full range PFO C9+ stream from the steam cracker/separation zone 10 (as disclosed in conjunction with the embodiment of FIG. 2). The selective hydrogenation zone 30 is in fluid communication with a hydrogen stream 32. The hydrogen stream 32 can be passed to the reactors at one or more locations as is known, and can be derived from sources including recycled hydrogen from the integrated steam cracking unit (not shown in FIGS. 1 and 2) and produced hydrogen 76 from the gas treatment zone 74. Make-up hydrogen from another source (not shown) is also typically added. Reaction conditions are set to maximize the conversion of polyaromatics, such as naphthalene, methylnaphthalene, anthracene, naphtheno-diaromatics (three rings, one saturated and two aromatic), and other polyaromatics contained in refractory PFO streams such as C10+, C20+ and even C30+ polyaromatics, by selective hydrogenation into aromatic compounds with one benzene ring. Aromatic compounds with one benzene ring include benzene, toluene, xylene, triethyl-benzene, methyl-ethylbenzene, trimethyl-benzene, di-ethyl-benzene, propyl-methyl-benzene, butyl-methyl-benzene, butyl-ethyl-benzene, and others including alkyl benzenes.

The outlet(s) of the selective hydrogenation zone 30 discharge the effluent stream 34, and in fluid communication with the selective hydrocracking zone 42. In certain embodiments (not shown), the hydrogenation reaction vessel outlet(s) are in fluid communication with one or more heat exchangers and separators (such as a high pressure cold or hot separator) for cooling and separation of reaction gases, and discharged as the effluent stream 34. In certain embodiments, one or more outlets of the selective hydrogenation zone 30 that discharge the effluent stream 34 are in fluid communication with one or more inlets of the separation zone 36. The separation zone 36 can include one or more simple or fractional distillation columns and generally includes one or more outlets for discharging light gases, stream 38 including LPG and H2, and the remainder of the one-ring C9+ effluent stream 34, stream 40. The outlet discharging the one-ring C9+ stream 40 in fluid communication with the selective hydrocracking zone 42. In certain embodiments, the one-ring C9+ effluent stream 34 is in fluid communication with the selective hydrocracking zone 42 without a distinct separation zone, and light gases pass with the remainder of the one-ring C9+ components.

In operation, the selective hydrogenation feedstock and a hydrogen stream are charged to the reactor(s) of the selective hydrogenation zone 30. The hydrogen stream contains an effective quantity of hydrogen to support the selective hydrogenation of the polyaromatics compounds in the feed, the reaction conditions, the selected catalysts and other factors, and can be any combination including recycle hydrogen from optional gas separation subsystems (not shown) between the reaction zone and fractionating zone, hydrogen derived from the hydrogen producers within the integrated system and process, stream 76, and make-up hydrogen as necessary.

The hydrogenation reaction effluent stream is typically passed to one or more high pressure and low pressure separation stages recover recycle hydrogen. For example, effluents from the hydrogenation reaction vessel are cooled in an exchanger and sent to a high pressure cold or hot separator. Separator tops are cleaned in an amine unit and the resulting hydrogen rich gas stream is passed to a recycling compressor to be used as a recycle gas in the hydrogenation reaction vessel. Separator bottoms from the high pressure separator, which are in a substantially liquid phase, are cooled and then introduced to a low pressure cold separator. Remaining gases including hydrogen and any light hydrocarbons, which can include $C_1$-$C_4$ hydrocarbons, can be conventionally purged from the low pressure cold separator and sent for further processing, for instance to the gas treatment zone 74. The liquid stream from the low pressure cold separator is passed to the fractionating zone or to the fractionating zone, or to the selective hydrocracking zone 42 without fractioning.

The hydrogenation reaction effluent stream can be passed to the separation zone 36 generally to recover a gas stream LPG/H2 and liquid products, a one ring C9+ stream. The gas stream, typically containing $H_2$, and light hydrocarbons ($C_1$-$C_4$), is discharged and recovered and can be further processed as is known in the art, including for recovery of recycle hydrogen. In certain embodiments one or more gas streams are discharged from one or more separators between the reactor and the fractionator (not shown), and gas stream can be optional from the fractionator. One or more cracked product streams are discharged from appropriate outlets of the fractionator and can be further processed and/or blended in downstream refinery operations to produce fuel products, or other hydrocarbon mixtures that can be used to produce petrochemical products. In certain embodiments, the separation zone 36 can operate as one or more flash vessels to separate heavy components at a suitable cut point, for example, a range corresponding to the one ring C9+ stream that is passed to the selective hydrocracking zone 42.

Reaction operating conditions and catalysts are selected so as to maximize the conversion of polyaromatics, such as naphthalene, methylnaphthalene, anthracene, naphtheno-diaromatics (three rings, one saturated and two aromatic), by selective hydrogenation into aromatic compounds with one benzene ring. While not wishing to be bound by theory, it is understood that selective hydrogenation of the polycyclic aromatic compounds proceeds via initial hydrogenation of their peripheral ring into a naphthenic ring, cleaves to aliphatic substituents, isomerizes to a branched naphthenic ring, and dealkylates. Dual functionality, hydrogenating and cracking, catalysts are useful for conversion of selective conversion of polycyclic aromatic compounds into aromatic compounds or bicyclic aromatic compounds.

The selective hydrogenation zone 30 generally operates under effective conditions including:

a reaction temperature (° C.) in the range of about 250-500, 250-480, 250-450, 250-400, 280-500, 280-480, 280-450, 280-400, 300-500, 300-480, 300-450, 300-400, 320-500, 320-480, 320-450 or 320-400° C.;

a reaction pressure (hydrogen partial pressure, kg/cm²) in the range of about 10-70, 10-50, 10-30, 20-70, 20-50 or 20-30 kg/cm²;

a hydrogen feed rate (standard liters per liter of hydrocarbon feed, SLt/Lt) in the range of about 30-5000, 30-4000, 30-3000, 30-2000, 50-5000, 50-4000, 50-3000, 50-2000, 100-5000, 100-4000, 100-3000, 100-2000, 300-5000, 300-4000, 300-3000 or 300-2000 SLt/Lt; and a LHSV in the range of about 0.1-20, 0.1-10, 0.1-5, 0.5-20, 0.5-10, 0.5-5, 1-20, 1-10, 1-5, 2-20, 2-10, or 2-5.

In certain embodiments, in which C9s and C20+ are substantially removed, the selective hydrogenation zone 30 generally operates under effective conditions including a reaction temperature (° C.) in the range of about, 250-480, 250-450, 250-400, 280-480, 280-450, 280-400, 300-480, 300-450, or 300-400° C.;

a reaction pressure (hydrogen partial pressure, kg/cm²) in the range of about 10-50, 10-30, 20-50 or 20-30 kg/cm²;

a hydrogen feed rate (standard liters per liter of hydrocarbon feed, SLt/Lt) in the range of about 30-4000, 30-3000, 30-2000, 50-4000, 50-3000, 50-2000, 100-4000, 100-3000, 100-2000, 300-4000, 300-3000, or 300-2000 SLt/Lt; and a LHSV in the range of about 0.1-20, 0.1-10, 0.1-5, 0.5-20, 0.5-10, 0.5-5, 1-20, 1-10, 1-5, 2-20, 2-10, or 2-5.

In certain embodiments, in which the C9+ PFO stream is used as feed, without separation of C9s or C20+, the selective hydrogenation zone 30 generally operates under effective conditions including:

reaction temperatures (° C.) in the range of about 250-500, 250-480, 250-450, 250-400, 280-500, 280-480, 280-450, 280-400, 300-500, 300-480, 300-450, 300-400, 320-500, 320-480, 320-450 or 320-400° C.;

a reaction pressure (hydrogen partial pressure, kg/cm²) in the range of about 10-70, 10-50, 10-30, 20-70, 20-50 or 20-30 kg/cm²;

a hydrogen feed rate (standard liters per liter of hydrocarbon feed, SLt/Lt) in the range of about 30-5000, 30-4000, 30-3000, 50-5000, 50-4000, 50-3000, 100-5000, 100-4000, 100-3000, 300-5000, 300-4000, or 300-3000 SLt/Lt; and a LHSV in the range of about 0.1-20, 0.1-10, 0.1-5, 0.5-20, 0.5-10, 0.5-5, 1-20, 1-10, 1-5, 2-20, 2-10, or 2-5.

In certain embodiments, in which C9s are removed and a portion of C20+ are removed (with the remainder passing to selective hydrogenation), the selective hydrogenation zone 30 generally operates under effective conditions including: a reaction temperature (° C.) in the range of about 250-480, 250-450, 250-400, 280-480, 280-450, 280-400, 300-480, 300-450, 300-400, 320-480, 320-450 or 320-400° C.;

a reaction pressure (hydrogen partial pressure, kg/cm²) in the range of about 10-50, 10-30, 20-50 or 20-30 kg/cm²;

a hydrogen feed rate (standard liters per liter of hydrocarbon feed, SLt/Lt) in the range of about 30-4000, 30-3000, 30-2000, 50-4000, 50-3000, 50-2000, 100-4000, 100-3000, 100-2000, 300-4000, 300-3000, or 300-2000 SLt/Lt; and a LHSV in the range of about 0.1-20, 0.1-10, 0.1-5, 0.5-20, 0.5-10, 0.5-5, 1-20, 1-10, 1-5, 2-20, 2-10, or 2-5.

In certain embodiments, in which C9s are removed and the C20+ are not removed, the selective hydrogenation zone 30 generally operates under effective conditions including:

a reaction temperature (° C.) in the range of about 250-500, 250-480, 250-450, 250-400, 280-500, 280-480, 280-450, 280-400, 300-500, 300-480, 300-450, 300-400, 320-500, 320-480, 320-450 or 320-400° C.;

a reaction pressure (hydrogen partial pressure, kg/cm²) in the range of about 10-70, 10-50, 10-30, 20-70, 20-50 or 20-30 kg/cm²;

a hydrogen feed rate (standard liters per liter of hydrocarbon feed, SLt/Lt) in the range of about 30-5000, 30-4000, 30-3000, 50-5000, 50-4000, 50-3000, 100-5000, 100-4000, 100-3000, 300-5000, 300-4000, or 300-3000 SLt/Lt; and a LHSV in the range of about 0.1-20, 0.1-10, 0.1-5, 0.5-20, 0.5-10, 0.5-5, 1-20, 1-10, 1-5, 2-20, 2-10, or 2-5.

The catalyst used in the selective hydrogenation zone 30 can be one or more conventionally known, commercially available or future developed hydrogenation catalysts effective to maximize the conversion of polyaromatics, such as naphthalene, methylnaphthalene, anthracene, naphtheno-di-aromatics (three rings, one saturated and two aromatic), by selective hydrogenation into aromatic compounds with one benzene ring. The selection, activity and form of the selective hydrogenation catalyst can be determined based on factors including but not limited to operating conditions, selected reactor configuration, feedstock composition, and desired degree of conversion. Dual functionality, hydrogenating and cracking, catalysts are useful for conversion of selective conversion of polycyclic aromatic compounds into aromatic compounds or bicyclic aromatic compounds. Suitable catalysts generally contain one or more first active components of metals or metal compounds (oxides, carbides or sulfides), for instance a metal selected from the Periodic Table of the Elements IUPAC Groups 6, 9, 10, 13 and/or 14, such as Mo, Co, Ir, Pd, Pt, Ni, W, Sn or Ga, and one or more second active components, for instance a metal, metal compound, non-metal such as P, or other non-metal compound.

In certain embodiments two or more of the first active components mentioned above are used. One, two or more of the above-mentioned active components are typically deposited or otherwise incorporated on a catalyst support, which can be amorphous and/or structured, such as silica-alumina, silica, titania, titania-silica, titania-silicates, zeolites (including HY, beta, mordenite, ZSM-5, ZSM-12, ZSM-22, ZSM-11, MCM-22, MCM-56, or SSZ-26/33 zeolites), or similar crystalline materials to zeolites such as SAPO. The catalyst support(s) can be subjected to treatment whereby support properties such as pore volume, surface area, and average pore size are altered, such as by meso-structuring treatments which include one or more of desilication, de-alumination, steaming, acid leaching, and templated re-crystallization. In embodiments in which P is used, elemental form of P can be added and treated with $H_2SO_4$, whereby after treatment P remains in the structure of the catalyst. Combinations of active components can be composed of different particles/granules containing a single active metal species, or particles containing multiple active components. In embodiments in which zeolites or other crystalline materials are used, they are conventionally formed with one or more binder components such as alumina, silica, silica-alumina, clay, titania and mixtures thereof. In certain embodiments, the catalyst particles have a pore volume in the range of about (cc/gm) 0.15-1.70, 0.15-1.50, 0.30-1.50 or 0.30-1.70; a specific surface area in the range of about (m²/g) 100-900, 100-500, 100-450, 180-900, 180-500, 180-450, 200-900, 200-500 or 200-450; and an average pore diameter of at least about 30, 45 or 50, in certain embodiments in the range of about 30-80, 45-80, 50-80, 30-100, 45-100 or 50-100, 30-200, 45-200 or 50-200 angstrom units. The active component(s) are incorporated in an effective concentration, for instance, in the range of (wt % based on the mass of the active component(s) relative to the total mass of the catalysts including the support and binders) 1-40, 1-30, 1-10, 1-5, 2-40, 2-30, 2-10, 3-40, 3-30 or 3-10. Effective catalysts to promote hydrogenation reactions include but are not limited to those having one or more effective first active components, for instance, Mo, Co, Ir, Pd, Pt, Ni, W, Sn or Ga, and optionally a second active components such as P, deposited or otherwise incorporated on a support formed of alumina and/or zeolite. Examples include but are not limited to MoP/zeolite (including HY zeolites), Pd/alumina (for instance catalysts similar to selective acetylene hydrogenation catalysts for ethylene production while minimizing ethane formation which are known), Pd/zeolite, MoP/alumina, NiP/alumina, NiP/zeolite, WP/alumina, WP/zeolite, or sulfided NiMo/alumina.

In certain embodiments, the catalyst and/or the catalyst support is prepared in accordance with U.S. Pat. No. 9,221,036 and its continuation U.S. Pat. No. 10,081,009 (jointly owned by the owner of the present application, and subject to a joint research agreement), which is incorporated herein by reference in its entirety. Such a support includes a modified zeolite support having one or more of Ti, Zr and/or Hf substituting the aluminum atoms constituting the zeolite framework thereof. For instance, the catalyst effective for hydrogenation can include one or more active component carried on a support containing a framework-substituted zeolite such as a ultra-stable Y-type zeolite, in which a part of aluminum atoms constituting a zeolite framework thereof is substituted one, two or all of Ti, Zr and Hf, for instance 0.1-5 mass % of each calculated on an oxide basis.

The ring-opening and dealkylation reaction zone 42 includes one or more reactors effective for operation in the absence of added hydrogen and carrying out selective ring-opening and dealkylation reaction, for instance including a fluidized bed reactor, a simulated moving-bed reactor, parallel reactor trains operating in swing mode, or other reaction vessel operating the absence of added hydrogen. In certain embodiments, the ring-opening and dealkylation reaction zone 42 includes a fluidized bed reactor to produce a stream 48 containing light gases and C2-C5 compounds including paraffins, and a dealkylated stream 46 containing BTX components; other streams that can be removed include a heavy C10+ aromatics stream 49. The stream 49 can be recycled to the fluidized bed reactor of the ring-opening and dealkylation reaction zone 42, recycled to the initial feed treatment zone upstream of the steam cracker (not shown), recycled to the steam cracker (not shown), used for fuel oil production, or a combination of these. In certain embodiments, if little hydrogen is produced within the ring-opening and dealkylation reaction, stream 48 also contains C2-C4 olefins, thereby increasing the overall olefin production from the integrated process and system including steam cracking and treatment of the PFO.

For example, FIG. 7 is a simplified schematic illustration of a fluidized bed reaction unit 222 that can be the ring-opening and dealkylation reaction zone 42, or a unit within the ring-opening and dealkylation reaction zone 42, for processing the one-ring C9+ streams including stream 40 and in certain embodiments stream 24. Fluidized bed reaction zone 222 includes a vessel 224 containing ring-opening dealkylation catalyst and having a feed inlet for receiving the stream 40 and in certain embodiments stream 24, a product outlet for discharging reaction effluents 226, a catalyst inlet for receiving replacement (fresh or regenerated) catalyst 228 and a catalyst outlet for discharging spent or partially spent catalyst 230. In certain embodiment an in-line catalyst regeneration system can be included (not shown) for regenerating spent catalyst. The charge is the stream 40 containing C9+ aromatics compounds from the selective hydrogenation zone 30 (optionally with gases separated via the separation zone 36), and in certain embodiments the separated one-ring C9+ stream 24 from the PFO separation zone 22. The feed is heated to a suitable reaction temperature and is introduced in the vessel 224 at sufficient fluid velocity to and with suitable gas distribution to promote stable fluidization of the catalyst. The fresh or regenerated solid catalyst particles 228 can be heated prior to introduction in the vessel. In a continuous process, fresh or regenerated solid catalyst particles 228 are added while spent solid catalyst particles 230 are withdrawn, typically for regeneration and reintroduction into the vessel 224.

In general, the operating conditions for the reactor of a suitable fluidized bed reaction vessel 224 include:

a reaction temperature (° C.) of from about 320-400, 320-420, 320-450, 350-400, 350-450, 350-420;

a reaction pressure (overall pressure, kg/cm$^2$) of from about 1-20, 1-30, or 1-40;

a contact time (in the reactor, seconds) of from about 1-20, 1-10, 1-30, 5-10, 5-20, or 5-30; and a catalyst-to-feed ratio (weight) of about 1:1 to 10:1, 1:1 to 20:1, 2:1 to 20:1, or 2:1 to 10:1.

Catalysts used in the ring-opening and dealkylation reaction zone 42, such as a suitable fluidized bed reaction vessel 224, can be one or more conventionally known, commercially available or future developed catalyst materials effective for selective ring opening and dealkylation in the absence of added hydrogen, in certain embodiments bifunctional active components supported on acidic zeolites. The selection, activity and form of the selective ring opening and dealkylation catalyst can be determined based on factors including but not limited to operating conditions, selected reactor configuration, feedstock composition, and desired degree of conversion. Dual functionality, hydrogenating and cracking, catalysts are useful for selective conversion of polycyclic aromatic compounds into monocyclic aromatic compounds or bicyclic aromatic compounds For example, suitable catalysts contain one or more active components that are metals or metal compounds (oxides, carbides or sulfides) selected from the Periodic Table of the Elements IUPAC Groups 6, 9, 10, 13, or 14, for example, one or more of Mo, Co, Ir, Pd, Pt, Ga, Ni, W or Sn. In certain embodiments suitable catalysts contain one or more active components that are non-metals or non-metal compounds such as P. In certain embodiments, suitable catalysts contain one or more first active components that are metals or metal compounds (oxides, carbides or sulfides) selected from the Periodic Table of the Elements IUPAC Groups 6, 9, 10, 14, for example, one or more of Mo, Co, Ir, Pd, Pt, Ga, Ni, W or Sn; and one or more second active components that are metals, metal compounds, non-metals such as P, or non-metal compounds. In certain embodiments suitable active components include one or more of Pt, Ir, Ni, P, $Ni_2P$, $Ni_3P_2$, Sn, Co, Mo, MoC, $Mo_2C$.

The one or more active component(s) are typically deposited or otherwise incorporated on a catalyst support, which can be a zeolite material such as USY zeolite, NaHY zeolite, ZSM-12 zeolite, mesoporous surface area (MSA) zeolite, $Al_2O_3$ zeolite, beta zeolite, or silcate-1 zeolite. The catalyst support(s) can be subjected to treatment whereby support properties such as pore volume, surface area, and average pore size are altered, such as by meso-structuring treatments which include one or more of desilication, de-alumination, steaming, acid leaching, and templated re-crystallization. In embodiments in which P is used, elemental form of P can be added and treated with $H_2SO_4$, whereby after treatment P remains in the structure of the catalyst. Combinations of active components can be composed of different particles/granules containing a single active metal species, or particles containing multiple active components. In embodiments in which zeolites or other crystalline materials are used, they are conventionally formed with one or more binder components such as alumina, silica, silica-alumina, clay, titania and mixtures thereof. In certain embodiments, the catalyst particles have a pore volume in the range of about (cc/gm) 0.15-1.70, 0.15-1.50, 0.30-1.50 or 0.30-1.70; a specific surface area in the range of about (m2/g) 100-900, 100-500, 100-450, 180-900, 180-500, 180-450, 200-900, 200-500 or 200-450; and an average pore diameter of at least about 30, 45 or 50, in certain embodiments in the range of about 30-80, 45-80, 50-80, 30-100, 45-100 or 50-100, 30-200, 45-200 or 50-200 angstrom units. The active component(s) are incorporated in an effective concentration, for instance, in the range of (wt % based on the mass of the active component(s) relative to the total mass of the catalysts including the support and binders) 1-40, 1-30, 1-10, 1-5, 2-40, 2-30, 2-10, 3-40, 3-30 or 3-10. Effective catalysts include but are not limited to bifunctional active components supported on acidic zeolites, with active components selected from Pt, Ir, Ni, P, $Ni_2P$, Sn, Co, Mo, $Mo_2C$ and zeolites selected from USY, NaHY, ZSM-12, MSA, $Al_2O_3$, Beta, and $SiO_2$. Examples include but are not limited to Ir/alumina, Pt/alumina, Ni/alumina, Sn/zeolite (including beta zeolite) and Co/zeolite (including USY zeolite).

In certain embodiments, the catalyst and/or the catalyst support is prepared in accordance with U.S. Pat. No. 9,221, 036 and its continuation U.S. Pat. No. 10,081,009 (jointly owned by the owner of the present application, and subject to a joint research agreement), which is incorporated herein by reference in its entirety. Such a support includes a modified zeolite support having one or more of Ti, Zr and/or Hf substituting the aluminum atoms constituting the zeolite framework thereof. For instance, the catalyst effective for ring opening and dealkylation can include one or more active component carried on a support containing a framework-substituted zeolite such as a ultra-stable Y-type zeolite, in which a part of aluminum atoms constituting a zeolite framework thereof is substituted one, two or all of Ti, Zr and Hf, for instance 0.1-5 mass % of each calculated on an oxide basis.

Products include the light gas stream 48 that contains fuel gas and LPG, for instance that are passed to an unsaturated gas plant or other suitable gas treatment (not shown). In certain embodiments LPG derived from stream 48 can be passed to the steam cracking zone 10. All or a portion of the dealkylated stream 46 containing light aromatics (for instance C6-C9 aromatics) is passed to the BTX splitting zone 56 and/or the transalkylation zone 66. A heavy C10+ aromatics stream (not shown) can be purged as a fuel The unsaturated gas plant and a recovery section (not shown) are operated to recover a C2− stream and a C3+ stream that are passed to an olefins recovery train. In certain embodiments light ends from ring-opening and dealkylation reactions are selectively treated for removal of contaminants while preserving ethylene content. In certain embodiments treatment of the C2− off-gas stream includes use of a multi-functional catalyst as is known in the operation of unsaturated gas plants before being passed to the olefins recovery train. Furthermore, a C3+ stream, generally containing C3s and C4s, is recovered from the high olefinic fluid catalytic cracking recovery section. In certain embodiments, this stream is treated in a mercaptan oxidation unit, as is known in the operation of unsaturated gas plants, before routing to the to the olefins recovery train or the steam cracking zone. In certain embodiments, the C3+ stream is sent to a splitter, which can be integrated with or separate from the olefins recovery train, to recover olefins, and the remaining LPGs are routed to the steam cracking zone.

The transalkylation zone 66 can contain one or more fixed bed, fluidized bed, ebullated bed, slurry bed, moving bed, continuous stirred tank, or tubular reactors, in series or parallel arrangement, which is/are generally operated in the presence of hydrogen under conditions, and utilizes catalyst(s), effective for conversion of a portion of the C9 stream from the BTX splitting zone 56 to xylenes. In certain embodiments, multiple reactors can be provided in parallel in transalkylation zone 66 to facilitate catalyst replacement and/or regeneration. The transalkylation zone 66 can also be in fluid communication with a source of toluene to react with C9 via transalkylation reactions to produce additional xylenes. In certain embodiments toluene and benzene used to react with C9s can be from the BTX stream in the BTX splitting zone 56. In general, the transalkylation zone 66 includes an inlet in fluid communication with an outlet of the BTX splitting zone 56 discharging the C9 stream 62, which includes trimethyl-benzene, methylethylbenzene, and other C9 compounds. The transalkylation zone 66 also includes one or more outlets for discharging product streams of BTX and C9+ aromatics, shown as stream 70 and the light gases by-product including $C_1$-$C_4$ and hydrogen, stream 72. The transalkylation zone 66 is in fluid communication with a hydrogen gas stream 68, which can be passed to the reactors at one or more locations as is known, and can be derived from sources including recycled hydrogen from the integrated steam cracking unit (not shown) and produced hydrogen 76 from the gas treatment zone 74. Make-up hydrogen from another source (not shown) is also typically added.

The transalkylation zone 66 includes an effective reactor configuration with the requisite reaction vessel(s), feed heaters, heat exchangers, hot and/or cold separators, product fractionators, strippers, and/or other units to process the C9 stream from the BTX splitting zone 56. The transalkylation zone 66 operates in the presence of hydrogen, stream 68, under conditions effective to, and using catalyst effective to, maximize the transalkylation of unconverted trimethyl-benzene C9 aromatics and toluene to produce xylenes. The transalkylation zone 66 can also be configured to perform isomerization of mixed xylenes to promote production of para-xylene. The light gases stream 72 (which in certain embodiments can contain naphtha-range byproducts such as light naphtha) is in fluid communication with the gas treatment zone 74 for recovery of hydrogen and recovery of LPG and optionally naphtha-range components as additional feed to the steam cracking zone.

The C9 stream from the BTX splitting zone 56 and a hydrogen stream 68 are charged to the reactor of the transalkylation zone 66. The hydrogen stream contains an effective quantity of hydrogen to support the mixed xylene production from the feed, the reaction conditions, the selected catalysts and other factors, and can be any combination including hydrogen derived from the hydrogen producers within the integrated system and process, stream 76, and in certain embodiments 90, and in certain embodiments make-up hydrogen from another source.

Mixed xylenes that form part of the transalkylation reaction effluent stream 70 include the less commercially valuable m-xylene forms in greater amounts than either p- or o-xylenes because of thermodynamic equilibrium relationships between the three isomers. In certain embodiments separation of p-xylene is desired, for instance when market demand favors p-xylene over o-xylene and m-xylene. In some embodiments, the transalkylation reaction zone can also include an isomerization reactor to isomerize para-xylene-free mixed xylenes received from a para-xylene separator to reestablish the thermodynamic equilibrium of C8 aromatics (that is, xylene isomers) para-xylene. A para-xylene separator can separate and produce product streams of para-xylene and para-xylene-free mixed xylenes (that is, ortho- and meta-xylenes) from the transalkylation reaction effluent. In some embodiments, the para-xylene separator can be an adsorptive process or a crystallization process. In some embodiments, the para-xylene-free mixed xylenes stream produced by the para-xylene separator can be provided to the transalkylation reaction zone 66 for reestablishing a C8 aromatics thermodynamic equilibrium of xylene isomers and promoting formation of additional para-xylene.

Reaction conditions are set to maximize the conversion of the C9 stream from the BTX splitting zone 56 to xylenes by transalkylation reactions. In general, the operating conditions for the reactor of a suitable transalkylation reaction zone 66 include: a reaction temperature (° C.) of from about 300-450, 300-420, 320-450 or 320-420; an operating pressure (hydrogen partial pressure, kg/cm$^2$) of from about 5-30, 5-25, 5-20, 10-30, 10-25 or 10-20;

a hydrogen feed rate (SL/L) of from about 1-10, 1-8, 2-10 or 2-8; and a feed rate (liquid hourly space velocity, h$^{-1}$) of from about 1-10, 1-8, 2-10 or 2-8.

The catalyst used in the transalkylation zone 66 can be one or more conventionally known, commercially available or future developed transalkylation catalyst zone 66 are effective to maximize selective conversion of trimethyl-benzene and toluene into mixed xylenes. In certain embodiments the catalyst used in the transalkylation zone 66 are capable of converting a significant portion and, in some embodiments, all, of the trimethyl-benzene in the C9 aromatics stream to mixed xylenes under effective operating conditions. An appropriate, commercially available transalkylation catalyst can be used. The selection, activity and form of the transalkylation catalyst can be determined based on factors including but not limited to operating conditions, selected reactor configuration, feedstock composition, ratios of toluene to trimethyl-benzene, and desired degree of conversion. For example, suitable catalysts generally contain one or more active components selected from the group consisting of silicon, phosphorus, boron, magnesium, tin, titanium, zirconium, molybdenum, germanium, indium, lanthanum, cesium, and any oxide thereof. The active component is typically deposited or otherwise incorporated on a support such as a beta zeolite support catalyst support, which can be a zeolite material such as USY zeolite, NaHY zeolite, ZSM-12 zeolite, mesoporous surface area (MSA) zeolite, Al$_2$O$_3$ zeolite, beta zeolite, mordenite zeolite or silicate-1 zeolite.

The method and system of the present invention have been described above and in the attached drawings; however, modifications will be apparent to those of ordinary skill in the art and the scope of protection for the invention is to be defined by the claims that follow.

The invention claimed is:

1. A process for treatment of pyrolysis fuel oil (PFO) from steam cracking that produces light olefins and PFO from a steam cracking feed, the process comprising:
   optionally separating the PFO into at least a first stream containing C9+ aromatics compounds with one benzene ring and containing hydrocarbons having a lower limit in the range of about 130-150° C. and an upper limit in the range of about 165-215° C., and a second stream containing C10+ aromatic compounds and containing hydrocarbons having a lower limit in the range of about 165-215° C. and an upper limit in the range of about 350-430° C.;
   selectively hydrogenating all or a portion of the PFO, or all or a portion of the second stream containing C10+ aromatics compounds, using catalysts and conditions, including hydrogen, effective for conversion of polyaromatics compounds contained in the PFO into aromatic compounds with one benzene ring to produce a selectively hydrogenated stream;
   reacting all or a portion of the selectively hydrogenated stream and optionally all or a portion of the first stream containing C9+ aromatics compounds with one benzene ring, using catalysts and conditions, and in the absence of added hydrogen, effective for ring opening and dealkylation to produce a dealkylated BTX+ stream containing BTX (benzene, toluene and xylenes) compounds and other components; and
   separating at least a portion of the dealkylated BTX+ stream into BTX compounds.

2. The process as in claim 1, wherein the PFO is obtained from steam cracking of treated crude oil or other treated heavy oil feeds, and comprises at least 40 wt % of polyaromatics having three or more aromatic rings including triaromatics, naphtheno-triaromatics, tetraaromatics, pentaaromatics and heavier poly-aromatics including asphaltenes and coke.

3. The process as in claim 1, wherein all or a portion of C20+ polyaromatic compounds are separated from the PFO or from the second stream, prior to selectively hydrogenating all or a portion of the PFO or all or a portion of the second stream containing C10+ aromatics compounds.

4. The process as in claim 1, wherein the PFO is separated into the first stream, the second stream, and a third stream containing C20+ polyaromatic compounds, and wherein the second stream contains C10+ compounds with no less than 2 and up to 6 benzene rings.

5. The process as in claim 1, wherein all or a portion of C9+ aromatics with one benzene ring are selectively hydrogenated with all or a portion of the PFO or all or a portion of the second stream containing C10+ aromatics compounds.

6. The process as in claim 1, wherein the PFO is separated into at least the first stream and the second stream, and wherein all or a portion of the first stream containing C9+ aromatics compounds with one benzene ring bypasses selective hydrogenating and is subjected to ring opening and dealkylation reactions.

7. The process as in claim 1, wherein the PFO stream or the second stream contains C20+ polyaromatic compounds, and wherein:
   selective hydrogenating occurs in the presence of a selective hydrogenating catalyst, and wherein selective hydrogenating conditions comprise a reaction temperature (° C.) in the range of about 250-500, a reaction pressure (hydrogen partial pressure, kg/cm$^2$) in the range of about 10-70, a hydrogen feed rate (standard liters per liter of hydrocarbon feed, SLt/Lt) in the range of about 30-5000, and a LHSV in the range of about 0.1-20; and
   ring opening and dealkylation reactions occur in the absence of added hydrogen, in the presence of a selective ring opening and dealkylation catalyst, and under reaction conditions comprising a reaction temperature (° C.) in the range of about 320-400, a reaction pressure (overall pressure, kg/cm$^2$) in the range of about 1-20, a contact time (seconds) of from about 1-20, and a catalyst-to-feed ratio (weight) of about 1:1 to 10:1.

8. The process as in claim 1, wherein all or a portion of C20+ polyaromatic compounds are removed prior to selective hydrogenation, and wherein:
   selective hydrogenating occurs in the presence of a selective hydrogenating catalyst, and wherein selective hydrogenating conditions comprise a reaction temperature (° C.) in the range of about 250-480, a reaction pressure (hydrogen partial pressure, kg/cm$^2$) in the range of about 10-50, a hydrogen feed rate (standard liters per liter of hydrocarbon feed, SLt/Lt) in the range of about 30-4000, and a LHSV in the range of about 0.1-20; and
   ring opening and dealkylation reactions occur in the absence of added hydrogen, in the presence of a selective ring opening and dealkylation catalyst, and under reaction conditions comprising a reaction temperature (° C.) in the range of about 320-400, a reaction pressure (overall pressure, kg/cm$^2$) in the range of about 1-20, a contact time (seconds) of from about 1-20, and a catalyst-to-feed ratio (weight) of about 1:1 to 10:1.

9. The process as in claim 1, wherein light gases from selective hydrogenating and/or ring opening and dealkylation reactions are treated and one or more LPG streams are recovered, wherein the one or more LPG streams are subjected to steam cracking.

10. The process as in claim 1, wherein the selectively hydrogenated stream is separated into an LPG stream that is treated and subjected to steam cracking, and a stream containing one-ring C9+ hydrocarbon compounds that is passed to ring opening and dealkylation reactions as all or a portion of the selectively hydrogenated stream.

11. The process as in claim 1, wherein separating at least a portion of the dealkylated BTX+ stream into BTX compounds further comprises separating C9 aromatic compounds, and wherein the process further comprises transalkylating the separated C9 aromatic compounds to produce a transalkylated effluent containing additional BTX compounds.

12. The process as in claim 11, wherein light gases from transalkylating are treated and one or more LPG streams are recovered, and wherein the one or more LPG streams are subjected to steam cracking.

13. The process as in claim 11, further comprising separating naphtha-range hydrocarbon compounds from the transalkylated effluent prior to separation into BTX compounds, and subjecting all or a portion of said naphtha-range hydrocarbon compounds to steam cracking zone.

14. The process as in claim 11, further comprising recovering a raffinate stream comprising non-aromatic compounds from the transalkylated effluent, and subjecting all or a portion of said raffinate stream to steam cracking.

15. The process as in claim 14, wherein recovering a raffinate stream is by aromatics extraction to separate the dealkylated BTX+ stream into the raffinate stream and an extract stream comprising aromatic compounds, and wherein the extract stream is separated into the BTX compounds.

16. The process as in claim 1, wherein separating the dealkylated BTX+ stream into BTX compounds further comprises separating C10+ compounds from the dealkylated BTX+ stream.

17. The process as in claim 16, wherein at least a portion of the separated C10+ compounds are subjected to reactions for ring opening and dealkylation together with the selectively hydrogenated stream.

18. The process as in claim 16, further comprising treating an initial feed and subjecting a treated initial feed to steam cracking, and wherein at least a portion of the separated C10+ compounds are subjected to treating with the initial feed.

19. The process as in claim 1, further comprising separating naphtha-range hydrocarbon compounds from the selectively hydrogenated stream prior to ring opening and dealkylation reactions, and subjecting all or a portion of said naphtha-range hydrocarbon compounds to steam cracking.

20. The process as in claim 1, further comprising separating naphtha-range hydrocarbon compounds from the dealkylated BTX+ stream prior to separation into BTX compounds, and subjecting all or a portion of said naphtha-range hydrocarbon compounds to steam cracking.

21. The process as in claim 1, further comprising separating at least a portion of the dealkylated BTX+ stream into BTX compounds includes recovering a raffinate stream comprising non-aromatic compounds, and subjecting all or a portion of said raffinate stream to steam cracking.

22. The process as in claim 21, wherein recovering a raffinate stream is by aromatics extraction to separate the dealkylated BTX+ stream into the raffinate stream and an extract stream comprising aromatic compounds, and wherein the extract stream is separated into the BTX compounds.

23. A steam cracking process comprising
   steam cracking the steam cracker feed to produce olefins, pyrolysis gasoline and PFO; and
   treating the PFO as in the process of claim 1.

24. A system for treatment of pyrolysis fuel oil (PFO) from a steam cracking zone that produces at least light olefins and PFO from a steam cracking feed, the system comprising:
   a PFO separation zone having one or more inlets in fluid communication with the steam cracking zone, one or more first outlets for discharging a fraction of the PFO including C9+ aromatics compounds with one benzene ring, one or more second outlets for discharging a fraction of the PFO including containing C10+ aromatic compounds, and one or more third outlets for discharging a fraction of the PFO including C20+ polyaromatic compounds;
   a selective hydrogenation zone having one or more inlets in fluid communication with the steam cracking zone to receive PFO or the one or more second outlets of the PFO separation zone to receive C10+ aromatic compounds from the PFO, and hydrogen, and one or more outlets for discharging reaction effluent including selectively hydrogenated aromatic compounds;
   a ring-opening and dealkylation reaction zone having one or more inlets in fluid communication with the one or more outlets of the selective hydrogenation zone, and hydrogen, and one or more outlets for discharging reaction effluent including dealkylated BTX+ compounds; and
   a BTX splitting zone having one or more inlets in fluid communication with the one or more outlets of the ring-opening and dealkylation reaction zone for discharging reaction effluent including dealkylated BTX+ compounds, and with the one or more outlets of the catalytic reforming zone for discharging a reformate stream, and one or more outlets for discharging BTX (benzene, toluene and xylenes) compounds.

25. The system as in claim 24, wherein the one or more first outlets for discharging C9+ aromatics compounds with one benzene ring are in fluid communication with one or more inlets of the ring-opening and dealkylation reaction zone, and wherein the one or more second outlets for discharging C10+ aromatic compounds are in fluid communication with one or more inlets of the selective hydrogenation zone.

* * * * *